(12) United States Patent
Bolourchi et al.

(10) Patent No.: US 11,661,497 B2
(45) Date of Patent: May 30, 2023

(54) FLAME-RETARDANT POLYMER COMPOSITION

(71) Applicant: Magris Talc USA, Inc., Three Forks, MT (US)

(72) Inventors: Maziyar Bolourchi, Los Gatos, CA (US); Saied Kochesf Ahani, San Ramon, CA (US)

(73) Assignee: IMERYS USA, INC., Roswell, GA (US)

( * ) Notice: Subject to any disclaimer, the term of this patent is extended or adjusted under 35 U.S.C. 154(b) by 252 days.

(21) Appl. No.: 16/603,353

(22) PCT Filed: Apr. 6, 2018

(86) PCT No.: PCT/US2018/026362
§ 371 (c)(1),
(2) Date: Oct. 7, 2019

(87) PCT Pub. No.: WO2018/187638
PCT Pub. Date: Oct. 11, 2018

(65) Prior Publication Data
US 2021/0087363 A1    Mar. 25, 2021

Related U.S. Application Data

(60) Provisional application No. 62/482,876, filed on Apr. 7, 2017.

(51) Int. Cl.
| | | |
|---|---|---|
| C08K 13/04 | (2006.01) | |
| C08G 69/14 | (2006.01) | |
| C08K 3/34 | (2006.01) | |
| C08K 3/40 | (2006.01) | |
| C08K 5/5313 | (2006.01) | |
| C08K 7/14 | (2006.01) | |
| C09K 21/12 | (2006.01) | |

(52) U.S. Cl.
CPC ............. *C08K 13/04* (2013.01); *C08G 69/14* (2013.01); *C08K 3/34* (2013.01); *C08K 3/40* (2013.01); *C08K 5/5313* (2013.01); *C08K 7/14* (2013.01); *C09K 21/12* (2013.01); *C08K 2003/343* (2013.01); *C08K 2201/003* (2013.01); *C08K 2201/004* (2013.01); *C08K 2201/006* (2013.01); *C08K 2201/014* (2013.01); *C08K 2201/016* (2013.01)

(58) Field of Classification Search
None
See application file for complete search history.

(56) References Cited

U.S. PATENT DOCUMENTS

| | | | |
|---|---|---|---|
| 2008/0033079 A1 | 2/2008 | Costanzi et al. | |
| 2010/0068330 A1* | 3/2010 | Martinoni | C08L 77/00 |
| | | | 425/542 |
| 2015/0094409 A1* | 4/2015 | Kenny | B29C 70/52 |
| | | | 524/100 |
| 2016/0053115 A1* | 2/2016 | Roth | C08K 3/02 |
| | | | 524/133 |
| 2019/0031857 A1* | 1/2019 | Rautenberg | C08L 77/02 |
| 2019/0256684 A1* | 8/2019 | Konishi | F02M 35/12 |

FOREIGN PATENT DOCUMENTS

WO    WO 2016/034455    *    3/2016

OTHER PUBLICATIONS

International Search Report and Written Opinion dated Jun. 7, 2018, in International Application No. PCT/US2018/026362 (9 pgs.).

* cited by examiner

*Primary Examiner* — Robert T Butcher
(74) *Attorney, Agent, or Firm* — Freeborn & Peters

(57) ABSTRACT

A flame-retardant polymer composition comprising a polymer, a flame retardant, a high aspect ratio particulate mineral and optionally a reinforcing material, articles made from and comprising said flame-retardant polymer composition and methods of making said flame-retardant polymer composition.

14 Claims, 6 Drawing Sheets

US 11,661,497 B2

FLAME-RETARDANT POLYMER COMPOSITION

CLAIM FOR PRIORITY

This application is a U.S. national phase entry of International Application No. PCT/US2018/026362, filed Apr. 6, 2018, which claims the benefit of priority of U.S. Provisional Patent Application No. 62/482,876, filed Apr. 7, 2017, to both, of which this application claims the benefit of priority, and the entirety of the subject matter of both of which is incorporated herein by reference.

TECHNICAL FIELD

The present invention relates generally to flame-retardant polymer compositions comprising a polymer, a flame retardant, a high aspect ratio particulate mineral and optionally a reinforcing material. The present invention further relates to articles comprising or made from said flame-retardant polymer compositions and methods of making said flame-retardant polymer compositions and said articles.

BACKGROUND

It is well-known in the art to produce flame-retardant polymer compositions for various functions. The requirements for the various flame-retardancy properties of a polymer composition may vary depending on the intended final use of the polymer composition. For example, the requirements relating to heat release, smoke production, vertical flame propagation, smoke density, smoke acidity and melt viscosity may vary depending on the intended final use of the polymer composition. The requirements for other properties (e.g. mechanical properties such as stiffness and tensile strength) may also vary depending on the intended final use of the polymer composition. These properties may be affected by the additives that are included in the polymer composition to obtain the required flame-retardancy properties. It is therefore desirable to provide alternative and/or improved flame-retardant polymer compositions.

SUMMARY

In accordance with a first aspect of the present invention there is provided a flame-retardant polymer composition comprising a polymer, a flame retardant, a high aspect ratio particulate mineral and optionally a reinforcing material. In certain embodiments, the flame-retardant polymer composition comprises a polymer, a flame retardant, a high aspect ratio particulate mineral and a reinforcing material.

In accordance with a second aspect of the present invention there is provided an article made from or comprising a flame-retardant polymer composition according to any aspect or embodiment of the present invention. In certain embodiments, the article is a car part. In certain embodiments, the article is a cable covered with a flame-retardant polymer composition according to any aspect or embodiment of the present invention.

In accordance with a third aspect of the present invention there is provided a method of making a flame-retardant polymer composition according to any aspect or embodiment of the present invention, the method comprising mixing the polymer, the flame retardant, the high aspect ratio particulate mineral and, where present, the reinforcing material.

In certain embodiments, the polymer is a polyamide.
In certain embodiments, the flame retardant is an organophosphate, a phosphinate, a halogenated organophosphate or a combination of one or more thereof. In certain embodiments, the flame retardant is an organic phosphinate.

In certain embodiments, the high aspect ratio particulate mineral is talc, mica, wollastonite, halloysite or a combination of one or more thereof. In certain embodiments, the high aspect ratio particulate mineral is wollastonite.

In certain embodiments, the flame-retardant polymer composition comprises a reinforcing material. In certain embodiments, the reinforcing material is glass fibres.

Certain embodiments of any aspect of the present invention may provide one of more of the following advantages:
  good (for example, improved) flame-retardancy properties (e.g. good or improved heat release, smoke production, flame spread, vertical flame propagation, smoke density, smoke acidity and melt viscosity);
  good (for example, improved) mechanical properties (e.g. stiffness (e.g. flexural and tensile modulus), heat deflection temperature, spiral flow length
  use of a reduced amount of polymer;
  use of a reduced amount of flame retardant
  use of a reduced amount of reinforcing material.

The details, examples and preferences provided in relation to any particulate one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

Embodiments of the invention will be described with reference to the following figures in which.

DETAILED DESCRIPTION

Figure 1:
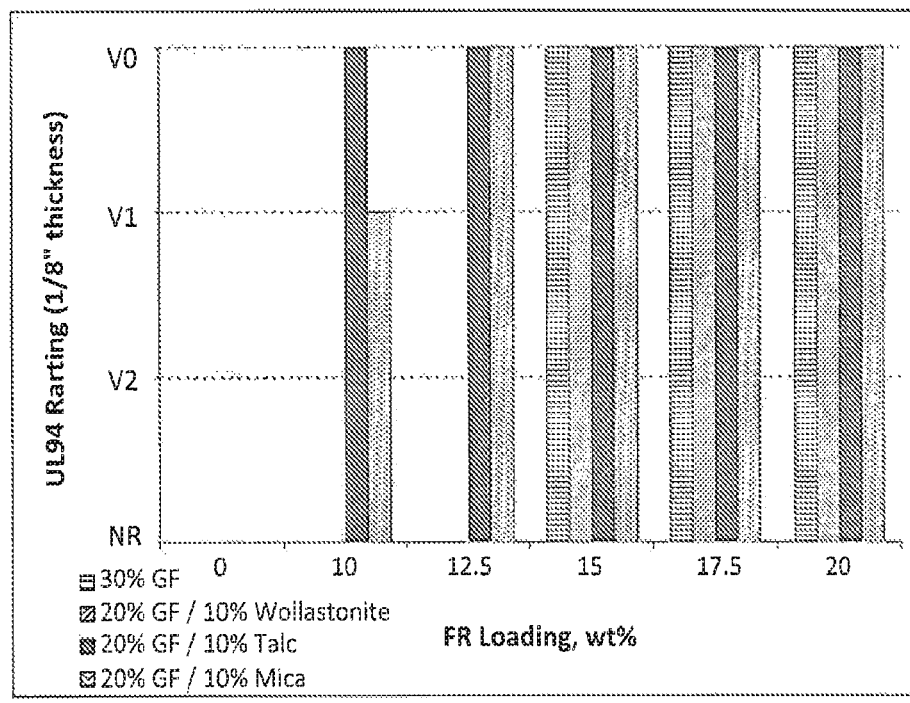
FIG. 1 shows the UL94 flame-retardancy rating of the compositions specified in Table 1 at a thickness of 118"

There is disclosed herein a flame-retardant polymer composition comprising a polymer, a flame retardant, a high aspect ratio particulate mineral and, optionally, a reinforcing material. The flame-retardant polymer composition may, for example, consist of or consist essentially of a flame retardant, a high aspect ratio particulate mineral and, optionally, a reinforcing material. The term "consisting essentially of" may, for example, exclude an additional element, step or ingredient not explicitly recited unless the additional element, step or ingredient does not materially affect the basic and novel properties of the invention. Where the one or more additional element(s), step(s) or ingredient(s) is/are one or more additional component(s) of a composition, the total amount of the additional component(s) in the composition may, for example, be limited to 10 wt %. For example, the total amount of the additional component(s) in the composition may be limited to 9 wt % or 8 wt % or 7 wt % or 6 wt % or 5 wt % or 4 wt % or 3 wt % or 2 wt % or 1 wt %.

The polymer may, for example, be a thermoplastic polymer. The polymer may, for example, be present in the form of a polymer matrix. The other components of the flame-retardant polymer composition (e.g. the flame retardant, the high aspect ratio particulate mineral, the optional reinforcing material) are dispersed in the polymer matrix. The polymer may, for example, be polyalkylene (e.g. polyethylene, polypropylene or polybutylene), polyvinyl ester (general formula —[RCOOCHCH$_2$]—), polystyrene, polyvinyl chloride, polyvinyl acetate, polyvinyl alcohol, polyacrylonitrile, acrylonitrile butadiene styrene, polyamide, polylactic acid, polybenzimidazole, polybenzoxazole, polybenzthiazole, polycarbonate, polyether sulfone, polyetherether ketone, polyimide, polyetherimide, polyphenylene sulfide, polytetrafluoroethylene, polyvinyl acetate (e.g. ethylene vinyl acetate or poly(meth methacrylate)), or a combination of two or more thereof. In certain embodiments, the polymer is one or more polyamide(s). Hereinafter, the present invention may tend to be discussed in terms of a polyamide. However, the present invention should not be construed as being limited to such embodiment.

The polymer may, for example, be present in the flame-retardant polymer composition in an amount of at least about 40% based on the total weight of the flame-retardant polymer composition. For example, the polymer may be present in the flame-retardant polymer composition in an amount of at least about 45 wt % or at least about 50 wt % or at least about 55 wt % or at least about 60 wt % or at least about 65 wt % or at least about 70 wt % based on the total weight of the flame-retardant polymer composition.

The polymer may, for example, be present in the flame-retardant polymer composition in an amount up to about 80 wt %, for example up to about 75 wt %, for example up to about 70 wt %, for example up to about 65 wt % based on the total weight of the flame-retardant polymer composition. The polymer may, for example, be present in the flame-retardant polymer composition in an amount ranging from about 40 wt % to about 80 wt % or from about 40 wt % to about 70 wt % or from about 40 wt % to about 60 wt % or from about 50 wt % to about 80 wt % or from about 50 wt % to about 70 wt % or from about 50 wt % to about 60 wt % based on the total weight of the flame-retardant polymer composition.

The term "flame retardant" refers to any chemical that, when added to a polymer, can prevent fire, inhibit or delay the spread of fire and/or limit the damage caused by fire.

The flame retardant may, for example, work by one or more of endothermic degradation, thermal shielding, dilution of gas phase and gas phase radical quenching. Flame retardants that work by endothermic degradation remove heat from the substrate and thus cool the material. Flame retardants that work by thermal shielding create a thermal insulation barrier between the burning and unburned parts of the material, for example by forming a char, which separates the flame from the material and slows heat transfer to the unburned material. Flame retardants that work by dilution of the gas phase produce inert gases (e.g. carbon dioxide and/or water) by thermal degradation and thus dilute the combustible gases, thus lowering the partial pressures of the combustible gases and oxygen and slowing the reaction rate. Flame retardants that work by gas phase radical quenching release substances such as hydrogen chloride and hydrogen bromide that react with H and OH radicals in the flame, forming less reactive radicals (e.g. Cl and Br radicals), which have much lower potential to propagate the radical oxidation reactions. In certain embodiments, the flame retardant used in the flame-retardant polymer compositions disclosed herein work by endothermic degradation and/or dilution of the gas phase.

In certain embodiments, the flame retardant is an intumescent flame retardant. This refers to any flame retardant that can swell as a result of heat exposure, thus increasing its volume and decreasing its density. The intumescent flame retardant may produce char upon combustion which can act as a thermal insulation barrier between the burning and unburned materials.

The flame retardant may, for example, be a particulate mineral flame retardant, an organohalogen and/or a phosphorous and/or nitrogen-containing compound.

The particulate mineral flame retardant may, for example, be aluminium hydroxide (ATH—Al(OH)$_3$), magnesium hydroxide (MDH—Mg(OH)$_2$), a combination of huntite and hydromagnesite, a particulate mineral hydrate, red phosphorous, a borate, or a combination of one or more thereof. In certain embodiments, the particulate mineral flame retardant is aluminium hydroxide, magnesium hydroxide or a combination of huntite and hydromagnesite.

The aluminium hydroxide may, for example, be gibbsite, bayerite, nordstrandite, doyleite or a combination of one or more thereof. The magnesium hydroxide may, for example, be brucite, chlorite or a combination of one or more thereof.

The particulate mineral flame retardant may, for example, be coated with surface treatment agent such as a fatty acid (e.g. stearic acid), fatty acid ester (e.g. stearate) or silane. This may, for example, assist in compounding with the polymer matrix.

The organohalogen compound may, for example, be an organochloride (e.g. chlorendic acid derivatives, chlorinated paraffin), an organobromide (e.g. decabromodiphenyl ether, decabromodiphenyl ethane, brominated polystyrenes, brominated carbonate oligomers, brominated epoxy oligomers, tetrabromophthalic anhydride, tetrabromobisphenol A, hexabromocyclododecane), a halogenated organophosphate (e.g. tris(1,3-dichloro-2-propyl)phosphate, tetrakis(2-chlorethyl)dichloroisoentyldiphosphate), or a combination of one or more thereof.

Organohalogen compounds may, for example, be used in combination with a synergist to enhance their efficacy. Synergists include antimony-containing compounds such as antimony trioxide, antimony pentoxide and sodium antimonite.

The phosphorous and/or nitrogen-containing compound may, for example, be red phosphorus, a phosphate, a polyphosphate (e.g. melamine polyphosphate), an organophosphate (e.g. triphenyl phosphate (TPP), resorcinol bis(diphenylphosphate) (RDP), bisphenol A diphenyl phosphate (BADP), tricresyl phosphate (TOP)), a phosphonate (e.g. dimethyl methylphosphonate (DMMP), a phosphinate (e.g. aluminium diethyl phosphinate), a halogenated organophosphate (e.g. tris(1,3-dichloro-2-propyl)phosphate, tetrakis(2-chlorethyl)dichloroisoentyldiphosphate), a phosphazene, a polyphosphazene, a triazine (e.g. melamine-cyanurate) or a combination of one or more thereof. In certain embodiments, the phosphorous-containing compound is an organophosphate, a phosphinate, a halogenated organophosphate or a combination of one or more thereof.

In certain embodiments, the flame retardant is a phosphorous-containing compound, Hereinafter, the present invention may tend to be discussed in terms of an organic phosphinate. However, the invention should not be construed as being limited to such embodiments.

The flame retardant may, for example, be present in the flame-retardant polymer composition in an amount of at least about 5 wt % based on the total weight of the flame-retardant polymer composition. For example, the flame retardant may be present in the flame-retardant polymer composition in an amount of at least about 6 wt % or at least about 8 wt % or at least about 10 wt % or at least about 12 wt % or at least about 14 wt % or at least about 15 wt % or at least about 16 wt % or at least about 18 wt % or at least about 20 wt % based on the total weight of the flame-retardant polymer composition.

The flame retardant may be present in the flame-retardant polymer composition in an amount up to about 40 wt % based on the total weight of the flame-retardant polymer composition. For example, the flame retardant may be present in the flame-retardant polymer composition in an amount up to about 35 wt % or up to about 30 wt % or up to about 28 wt % or up to about 26 wt % or up to about 25 wt % or up to about 24 wt % or up to about 22 wt % or up to about 20 wt % based on the total weight of the flame-retardant polymer composition.

The term "high aspect ratio particulate mineral" refers to a mineral having particles that are acicular or lamellar. Lamellar particles generally have a small, flat and flaky or platy appearance, Acicular particles generally have a long, thin fibre or needle-like appearance.

The high aspect ratio particulate mineral may, for example, be selected from talc, mica, wollastonite, halloysite, kaolin, bentonite, perlite and combinations of one or more thereof. In certain embodiments, the high aspect ratio is selected from talc, mica, wollastonite and combinations of one or more thereof. Hereinafter, the present invention may tend to be discussed in terms of wollastonite. However, the invention should not be construed as being limited to such embodiments.

A particulate talc mineral refers to lamellar particulate material made of hydrated magnesium silicate having the chemical formula $H_2Mg_3(SiO_3)_4$ or $Mg_3Si_4O_{10}(OH)_2$, or the mineral chlorite (hydrated magnesium aluminium silicate), a combination thereof, or a mineral substance derived therefrom and having similar properties.

The particulate talc mineral may, for example, be obtained from a natural source by grinding. For example, the particulate talc mineral may be obtained by or obtainable by delamination of talc suspended in a liquid.

Natural talc particulate is typically obtained by crushing and then grinding a mineral source of talc, which may be followed by a particle size classification step, in order to obtain a product having a desired particle size distribution. The particulate solid material may be ground autogenously, i.e. by attrition between the particles of the solid material themselves, or, alternatively, in the presence of a particulate grinding medium comprising particles of a different material from the talc particulate to be ground. These processes may be carried out with or without the presence of a dispersant and biocides, which may be added at any stage of the process.

In certain embodiments, the talc particulate is obtained and/or obtainable by a process according to that described in U.S. Pat. No. 6,348,536, the entire contents of which are hereby incorporated by reference.

More particularly, the talc particulate may be prepared by a process comprising:
(a) talc with a predetermined initial particle size is suspended in a liquid,
(b) the suspension is subjected to a delamination operation adapted so as to produce a separation of the leaves of the particles and so as to obtain a particle size less than the initial particle size,
(c) optionally subjecting the suspension to a selection as to eliminate particles with a size greater than a predetermined size,
(d) drying the suspension, and
(e) optionally treating the particles so as to limit the creation of strong bonds between them.

The starting talc is typically chosen having an initial particle size which is greater than the desired particle size. In certain embodiments, the starting talc is suspended in water in the presence of a dispersing agent such that the weight of dry matter based on the total weight of the suspension is from about 10% to about 60%. The suspension is typically homogenous. The grinding operation during delamination is, in certain embodiments, carried out as to obtain a $d_{50laser}$ of from about 10 µm to about 50 µm. The selection step may comprise hydrodynamic selection, which may be carried out in a turbine selector or in a hydrocyclone or in a centrifuge with an endless extraction screw. The suspension is advantageously dried in such a way as to reach a residual liquid level below 1%.

In certain embodiments, the talc particulate is prepared by a process comprising:
(a) delaminating a liquid suspension of a relatively coarse talc particulate having an initial particle size with a $d_{50laser}$ which is greater than a desired $d_{50laser}$ (e.g., greater than a desired $d_{maser}$ of from about 10 µm to about 50 urn, or from about 10 µm to about 35 µm), to obtain a talc particulate having a particle size less than the initial particle size;
(b) at least partially drying the suspension thereby obtaining a talc particulate having the desired $d_{50laser}$ and optionally a desired lamellarity index.

In certain embodiments, the inorganic particulate, for example, talc particulate is not chemically treated during processing to obtain the desired particle size and/or lamellarity.

A particulate mica mineral refers to a group of lamellar phyllosilicate minerals having the general formula $X_2Y_{4-6}Z_8O_{20}(OH,F)_4$, where X is K, Na, Ca, Ba, Rb or Cs (usually K, Na, or Ca), Y is Al, Mg, Fe, Mn, Cr, Ti, Li (usually Al, Mg or Fe), and Z is Si, Al, $Fe^{3+}$ or Ti (usually Si or Al). Micas can be dioctahedral (Y=4) or trioctahedral (Y=6). Common mica has K or Na as X, brittle mica has Ca as X. Mica minerals have nearly perfect basal cleavage and are monoclinic, with a tendency towards pseudohexagonal crystals.

A particulate wollastonite mineral refers to a calcium inosilicate mineral ($CaSiO_3$) that may contain small amounts of iron, magnesium and/or manganese substituting for calcium. Wollastonite contains chains of [$SiO_4$] tetrahedral sharing common vertices, running parallel to the b-axis. The chain motif repeats after three tetrahedral. Wollastonite crystals are generally acicular in shape.

A particulate halloysite mineral refers to a lamellar or acicular monoclinic aluminosilicate clay mineral with the empirical formula $Al_2Si_2O_5(OH)_4$. Halloysite can be hydrated or unhydrated. The halloysite may, for example, have a moisture content equal to or less than about 5 wt % or equal to or less than about 4 wt % or equal to or less than about 3 wt % based on the total weight of the halloysite mineral.

A particulate kaolin mineral refers to the minerals kaolinite, dickite, nacrite and halloysite. The kaolin may, for example, be partially or fully calcined. The kaolin may, for example, be non-calcined. The kaolin may be a platy kaolin or a hyper-platy kaolin. By 'platy' kaolin is meant kaolin having a high shape factor. A platy kaolin has a shape factor from about 20 to less than about 60. A hyper-platy kaolin has a shape factor from about 60 to 100 or greater than 100. "Shape factor", as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference in its entirety. As described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

Kaolin clay may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90% by weight, in some cases greater than about 95% by weight of kaolinite.

Kaolin clay may be prepared from the raw natural kaolin clay mineral by one or more other processes which are well known to those skilled in the art, for example by known refining or beneficiation steps. For example, the clay mineral may be bleached with a reductive bleaching agent, such as sodium hydrosuifite. If sodium hydrosulfite is used, the bleached clay mineral may optionally be dewatered, and optionally washed and again optionally dewatered, after the sodium hydrosulfite bleaching step. The clay mineral may be treated to remove impurities, e. g. by flocculation, flotation, or magnetic separation techniques well known in the art.

The process for preparing the particulate kaolin clay may also include one or more comminution steps, e.g., grinding or milling. Light comminution of a coarse kaolin is used to give suitable delamination thereof. The comminution may be carried out by use of beads or granules of a plastic (e. g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

A particulate bentonite mineral refers to an absorbent aluminium phyllosilicate clay consisting mostly of montmorillonite. The bentonite may, for example, be a sodium bentonite, a calcium bentonite, a potassium bentonite or combinations of one or more thereof. Bentonite is often found associated with the minerals illite and/or kaolinite.

A particulate perlite mineral refers to a hydrated natural glass that may contain, for example, about 72 to about 75% $SiO_2$, about 12 to about 14% $Al_2O_3$, about 0.5 to about 2% $Fe_2O_3$, about 3 to about 5% $Na_2O$, about 4 to about $K_2O$, about 0.4 to about 1.5% CaO (by weight), and small amounts of other metallic elements, Perlite may be distinguished from other natural glasses by a higher content (such as about 2 to about 5% by weight) of chemically-bonded water, the presence of a vitreous, pearly luster, and characteristic concentric or arcuate onion skin-like (i.e., perlitic) fractures. Perlite may be expanded or non-expanded. Perlite products may be prepared by milling and thermal expansion, and may possess unique physical properties such as high porosity, low bulk density, and chemical inertness. Average particle size for the milled expanded perlite ranges from 5 to 200 microns, pore volume ranges from 2 to 10 L/mg with median pore size from 5 to 20 microns. Prior to processing, perlite may be gray to green in color with abundant spherical cracks that cause it to break into small pearl-like masses.

When a particulate mineral (e.g. particulate mineral flame retardant, high aspect ratio particulate mineral) is obtained from naturally occurring sources, it may be that some mineral impurities will inevitably contaminate the ground material. For example, naturally occurring talc may occur in association with other minerals such as dolomite. Also, in some circumstances, minor additions of other minerals may be included, for example, one or more of dolomite, kaolin, calcined kaolin, wollastonite, bauxite, or mica, could also be present. In general, however, the particulate minerals used in the invention will each contain less than 5% by weight, for example less than 2 wt %, for example less than 1% by weight of other minerals.

In some embodiments, the particulate minerals (e.g. particulate mineral flame retardant, high aspect ratio particulate mineral) each independently undergoes minimal processing following mining or extraction. In a further embodiment, the particulate mineral is subjected to at least one physical modification process. The skilled artisan will readily know physical modification processes appropriate for use, which may be now known or hereafter discovered; appropriate physical modification processes include, but are not limited to, comminution (e.g. crushing, grinding, milling), drying, and classifying (e.g. air classification, hydrodynamic selection, screening and/or sieving). In yet other embodiments, the particulate minerals are each independently subjected to at least one chemical modification process. The skilled artisan will readily know chemical modification processes appropriate for use in the present inventions, which may be now known or hereafter discovered; appropriate chemical modification processes include but are not limited to, silanization and calcination. The particulate talc material may, for example, be surface treated or surface untreated. The surface treatment may, for example, serve to modify a property of the talc particulate and/or the liquid composition into which it is incorporated. In certain embodiments, the surface treatment is present in an amount up to about 5 wt. %, based on the total weight of particulate mineral, for example, from about 0.001 wt. % to about 5 wt. %, or from about 0.01 wt. % to about 2 wt. %, or from about 0.1 wt. % to about 2 wt. %, or from about 0.5 wt. % to about 1.5 wt. %, based on the total weight of particulate mineral. In certain embodiments, the particulate mineral is not surface treated.

The high aspect ratio particulate mineral (e.g. halloysite) may, for example, have a moisture content equal to or less than about 5% based on the total weight of the high aspect ratio particulate mineral. For example, the high aspect ratio particulate mineral (e.g. halloysite) may have a moisture content equal to or less than about 4.5 wt % or equal to or less than about 4 wt % or equal to or less than about 3.5 wt % or equal to or less than about 3 wt % based on the total weight of the high aspect ratio particulate mineral. For example, the high aspect ratio particulate mineral may have a moisture content of at least about 0.5 wt % or at least about 1 wt % based on the total weight of the high aspect ratio particulate mineral.

The high aspect ratio particulate mineral may, for example, have an aspect ratio ranging from about 2 to about 150. For example, the high aspect ratio particulate mineral may have an aspect ratio ranging from about 2 to about 145 or from about 2 to about 140 or from about 2 to about 135 or from about 2 to about 130 or from about 2 to about 125 or from about 2 to about 120 or from about 2 to about 115 or from about 2 to about 110 or from about 2 to about 105 or from about 2 to about 100. For example, the high aspect ratio particulate mineral may have an aspect ratio ranging from about 5 to about 150 or from about 5 to about 145 or from about 5 to about 140 or from about 5 to about 135 or from about 5 to about 130 or from about 5 to about 125 or from about 5 to about 120 or from about 5 to about 115 or from about 5 to about 110 or from about 5 to about 105 or from about 5 to about 100. For example, the high aspect ratio particulate mineral may have an aspect ratio ranging from about 3 to about 95 or from about 4 to about 90 or from about 5 to about 85 or from about 6 to about 80 or from about 7 to about 75 or from about 8 to about 70 or from about 9 to about 65 or from about 10 to about 60.

As used in herein, the expression "aspect ratio" means the diameter of the circle of area equivalent to that of a face of the particle divided by the mean thickness of that particle. Aspect ratio may be determined using electron microscopy methods. For example, for a given particle, for a superimposed circle having an area equivalent to that of the face of the particle, where the diameter of that circle is d, the thickness of the particle is t, the aspect ratio of the particle is d divided by t.

Alternatively or additionally, the aspect ratio for platy minerals such as talc and mica may also, for example, be calculated by particle size analysis using the Parslow/Jennings or Pabst Equation.

$$\text{Aspect Ratio} = \frac{3\pi}{4} \cdot (d_{50(laser)} / d_{50(sedigraph)})^2$$

The high aspect ratio particulate mineral may, for example, have a $d_{50}$ (sedigraph) ranging from about 0.1 μm to about 40 μm. For example, the high aspect ratio particulate mineral may have a $d_{50}$ (sedigraph) ranging from about 0.2 μm to about 35 μm or from about 0.5 μm to about 30 μm or from about 0.5 μm to about 25 μm or from about 0.5 μm to about 20 μm or from about 1 μm to about 40 μm or from about 1 μm to about 35 μm or from about 1 μm to about 30 μm or from about 1 μm to about 25 μm or from about 1 μm to about 20 μm.

The high aspect ratio particulate mineral may, for example, have a $d_{50}$ (sedigraph) ranging from about 1 μm to about 20 μm. For example, the high aspect ratio particulate mineral may have a $d_{50}$ (sedigraph) ranging from about 2 μm to about 19 μm or from about 3 μm to about 18 μm or from about 4 μm to about 17 μm or from about 5 μm to about 16 μm or from about 6 μm to about 15 μm or from about 7 μm to about 14 μm or from about 8 μm to about 13 μm or from about 9 μm to about 12 μm or from about 10 μm to about 11 μm.

The high aspect ratio particulate mineral may, for example, have a $d_{10}$ (sedigraph) ranging from about 0.05 μm to about 10 μm. For example, the high aspect ratio particulate mineral may have a $d_{10}$ (sedigraph) ranging from about 0.1 μm to about 8 μm or from about 0.1 μm to about 6 μm or from about 0.2 μm to about 5 μm or from about 0.2 μm to about 4 μm or from about 0.2 μm to about 3 μm or from about 0.2 μm to about 2 μm or from about 0.5 μm to about 10 μm or from about 0.5 μm to about 5 μm or from about 0.5 μm to about 2 μm.

The high aspect ratio particulate mineral may, for example, have a $d_{10}$ (sedigraph) ranging from about 0.05 μm to about 2 μm. For example, the high aspect ratio particulate mineral may have a $d_{10}$ (sedigraph) ranging from about 0.1 μm to about 1.9 μm or from about 0.2 μm to about 1.8 μm or from about 0.3 μm to about 1.7 μm or from about 0.4 μm to about 1.6 μm or from about 0.5 μm to about 1.5 μm or from about 0.6 μm to about 1.4 μm or from about 0.7 μm to about 1.3 μm or from about 0.8 μm to about 1.2 μm or from about 0.9 μm to about 1.1 μm.

The high aspect ratio particulate mineral may, for example, have a $d_{90}$ (sedigraph) ranging from about 1 μm to about 150 μm. For example, the high aspect ratio particulate mineral may have a $d_{90}$ (sedigraph) ranging from about 1 μm to about 140 μm or from about 1 μm to about 130 μm or form about 1 μm to about 120 μm or from about 1 μm to about 110 μm or from about 1 μm to about 100 μm or from about 1 μm to about 90 μm or from about 1 μm to about 80 μm or from about 1 μm to about 70 μm or from about 1 μm to about 60 μm or from about 1 μm to about 50 μm or from about 1 μm to about 40 μm or from about 1 μm to about 30 μm. For example, the high aspect ratio particulate mineral may have a $d_{90}$ (sedigraph) ranging from about 5 μm to about 140 μm or from about 5 μm to about 130 μm or form about 5 μm to about 120 μm or from about 5 μm to about 110 μm or from about 5 μm to about 100 μm or from about 5 μm to about 90 μm or from about 5 μm to about 80 μm or from about 5 μm to about 70 μm or from about 5 μm to about 60 μm or from about 5 μm to about 50 μm or from about 5 μm to about 40 μm or from about 5 μm to about 30 μm. For example, the high aspect ratio particulate mineral may have a $d_{90}$ (sedigraph) ranging from about 10 μm to about 140 μm or from about 10 μm to about 130 μm or form about 10 μm to about 120 μm or from about 10 μm to about 110 μm or from about 10 μm to about 100 μm or from about 10 μm to about 90 μm or from about 10 μm to about 80 μm or from about 10 μm to about 70 μm or from about 10 μm to about 60 μm or from about 10 μm to about 50 μm or from about 10 μm to about 40 μm or from about 10 μm to about 30 μm.

The high aspect ratio particulate mineral may, for example, have a $d_{90}$ (sedigraph) ranging from about 5 μm to about 40 μm. For example, the high aspect ratio particulate mineral may have a $d_{90}$ (sedigraph) ranging from about 6 μm to about 39 μm or from about 7 μm to about 38 μm or form about 8 μm to about 37 μm or from about 9 μm to about 36 μm or from about 10 μm to about 35 μm or from about 11 μm to about 34 μm or from about 12 μm to about 33 μm or from about 13 μm to about 32 μm or from about 14 μm to about 31 μm or from about 15 μm to about 30 μm or from about 16 μm to about 29 μm or from about 17 μm to about 28 μm or from about 18 μm to about 27 μm or from about 19 μm to about 26 μm or from about 20 μm to about 25 μm.

The high aspect ratio particulate mineral may, for example, have a $d_{95}$ (sedigraph) ranging from about 2 μm to about 180 μm. For example, the high aspect ratio particulate mineral may have a $d_{95}$ (sedigraph) ranging from about 2 μm to about 170 μm or from about 2 μm to about 160 μm or form about 2 μm to about 150 μm or from about 2 μm to about 140 μm or from about 2 μm to about 130 μm or from about 2 μm to about 120 μm or from about 2 μm to about 110 μm or from about 2 μm to about 100 μm or from about 2 μm to about 90

µm or from about 2 µm to about 80 µm or from about 2 µm to about 70 µm or from about 2 µm to about 60 µm or from about 2 µm to about 50 µm or from about 2 µm to about 40 µm or from about 2 µm to about 30 µm. For example, the high aspect ratio particulate mineral may have a $d_{95}$ (sedigraph) ranging from about 5 µm to about 170 µm or from about 5 µm to about 160 µm or form about 5 µm to about 150 µm or from about 5 µm to about 140 µm or from about 5 µm to about 130 µm or from about 5 µm to about 120 µm or from about 5 µm to about 110 µm or from about 5 µm to about 100 µm or from about 5 µm to about 90 µm or from about 5 µm to about 80 µm or from about 5 µm to about 70 µm or from about 5 µm to about 60 µm or from about 5 µm to about 50 µm or from about 5 µm to about 40 µm or from about 5 µm to about 30 µm. For example, the high aspect ratio particulate mineral may have a $d_{95}$ (sedigraph) ranging from about 10 µm to about 170 µm or from about 10 µm to about 160 µm or from about 10 µm to about 150 µm or from about 10 µm to about 140 µm or from about 10 µm to about 130 µm or from about 10 µm to about 120 µm or from about 10 µm to about 110 µm or from about 10 µm to about 100 µm or from about 10 µm to about 90 µm or from about 10 µm to about 80 µm or from about 10 µm to about 70 µm or from about 10 µm to about 60 µm or from about 10 µm to about 50 µm or from about 10 µm to about 40 µm or from about 10 µm to about 30 µm.

The high aspect ratio particulate mineral may, for example, have a $d_{95}$ (sedigraph) ranging from about 5 µm to about 40 µm. For example, the high aspect ratio particulate mineral may have a $d_{95}$ (sedigraph) ranging from about 6 µm to about 39 µm or from about 7 µm to about 38 µm or form about 8 µm to about 37 µm or from about 9 µm to about 36 µm or from about 10 µm to about 35 µm or from about 11 µm to about 34 µm or from about 12 µm to about 33 µm or from about 13 µm to about 32 µm or from about 14 µm to about 31 µm or from about 15 µm to about 30 µm or from about 16 µm to about 29 µm or from about 17 µm to about 28 µm or from about 18 µm to about 27 µm or from about 19 µm to about 26 µm or from about 20 µm to about 25 µm.

The high aspect ratio particulate mineral may, for example, have a $d_{50}$ (laser) ranging from about 2 µm to about 250 µm. For example, the high aspect ratio particulate mineral may have a $d_{50}$ (laser) ranging from about 2 µm to about 240 µm or from about 2 µm to about 230 µm or from about 2 µm to about 220 µm or from about 2 µm to about 210 µm or from about 2 µm to about 200 µm or from about 2 µm to about 190 µm or from about 2 µm to about 180 µm or from about 2 µm to about 170 µm or from about 2 µm to about 160 µm or from about 2 µm to about 150 µm or from about 2 µm to about 140 µm or from about 2 µm to about 130 µm or from about 2 µm to about 120 µm or from about 2 µm to about 110 µm or from about 2 µm to about 100 µm or from about 2 µm to about 90 µm or from about 2 µm to about 80 µm or from about 2 µm to about 70 µm or from about 2 µm to about 60 µm or from about 2 µm to about 50 µm or from about 2 µm to about 40 µm or from about 2 µm to about 30 µm. For example, the high aspect ratio particulate mineral may have a $d_{50}$ (laser) ranging from about 5 µm to about 240 µm or from about 5 µm to about 230 µm or from about 5 µm to about 220 µm or from about 5 µm to about 210 µm or from about 5 µm to about 200 µm or from about 5 µm to about 190 µm or from about 5 µm to about 180 µm or from about 5 µm to about 170 µm or from about 5 µm to about 160 µm or from about 5 µm to about 150 µm or from about 5 µm to about 140 µm or from about 5 µm to about 130 µm or from about 5 µm to about 120 µm or from about 5 µm to about 110 µm or from about 5 µm to about 100 µm or from about 5 µm to about 90 µm or from about 5 µm to about 80 µm or from about 5 µm to about 70 µm or from about 5 µm to about 60 µm or from about 5 µm to about 50 µm or from about 5 µm to about 40 µm or from about 5 µm to about 30 µm. For example, the high aspect ratio particulate mineral may have a $d_{50}$ (laser) ranging from about 10 µm to about 240 µm or from about 10 µm to about 230 µm or from about 10 µm to about 220 µm or from about 10 µm to about 210 µm or from about 10 µm to about 200 µm or from about 10 µm to about 190 µm or from about 10 µm to about 180 µm or from about 10 µm to about 170 µm or from about 10 µm to about 160 µm or from about 10 µm to about 150 µm or from about 10 µm to about 140 µm or from about 10 µm to about 130 µm or from about 10 µm to about 120 µm or from about 10 µm to about 110 µm or from about 10 µm to about 100 µm or from about 10 µm to about 90 µm or from about 10 µm to about 80 µm or from about 10 µm to about 70 µm or from about 10 µm to about 60 µm or from about 10 µm to about 50 µm or from about 10 µm to about 40 µm or from about 10 µm to about 30 µm. For example, the high aspect ratio particulate mineral may have a $d_{50}$ (laser) ranging from about 20 µm to about 240 µm or from about 20 µm to about 230 µm or from about 20 µm to about 220 µm or from about 20 µm to about 210 µm or from about 20 µm to about 200 µm or from about 20 µm to about 190 µm or from about 20 µm to about 180 µm or from about 20 µm to about 170 µm or from about 20 µm to about 160 µm or from about 20 µm to about 150 µm or from about 20 µm to about 140 µm or from about 20 µm to about 130 µm or from about 20 µm to about 120 µm or from about 20 µm to about 110 µm or from about 20 µm to about 100 µm or from about 20 µm to about 90 µm or from about 20 µm to about 80 µm or from about 20 µm to about 70 µm or from about 20 µm to about 60 µm or from about 20 µm to about 50 µm or from about 20 µm to about 40 µm or from about 20 µm to about 30 µm.

The high aspect ratio particulate mineral may, for example, have a $d_{50}$ (laser) ranging from about 5 µm to about 40 µm. For example, the high aspect ratio particulate mineral may have a $d_{50}$ (laser) ranging from about 6 µm to about 39 µm or from about 7 µm to about 38 µm or from about 8 µm to about 37 µm or from about 9 µm to about 36 µm or from about 10 µm to about 35 µm or from about 11 µm to about 34 µm or from about 12 µm to about 33 µm or from about 13 µm to about 32 µm or from about 14 µm to about 31 µm or from about 15 µm to about 30 µm or from about 16 µm to about 29 µm or from about 17 µm to about 28 µm or from about 18 µm to about 27 µm or from about 19 µm to about 26 µm or from about 20 µm to about 25 µm.

The high aspect ratio particulate mineral may, for example, have a $d_{10}$ (laser) ranging from about 2 µm to about 50 µm. For example, the high aspect ratio particulate mineral may have a $d_{10}$ (laser) ranging from about 2 µm to about 40 µm or from about 2 µm to about 30 µm or from about 2 µm to about 20 µm or from about 2 µm to about 10 µm or from about 2 µm to about 5 µm. For example, the high aspect ratio particulate mineral may have a $d_{10}$ (laser) ranging from about 3 µm to about 40 µm or from about 3 µm to about 30 µm or from about 3 µm to about 20 µm or from about 3 µm to about 10 µm or from about 3 µm to about 5 µm.

The high aspect ratio particulate mineral may, for example, have a $d_{10}$ (laser) ranging from about 2 µm to about 10 µm. For example, the high aspect ratio particulate mineral may have a $d_{10}$ (laser) ranging from about 3 µm to about 9 µm or from about 4 µm to about 8 µm or from about 5 µm to about 7 µm or from about 6 µm to about 7 µm.

The high aspect ratio particulate mineral may, for example, have a $d_{90}$ (laser) ranging from about 5 µm to about 400 μm. For example, the high aspect ratio particulate mineral may have a $d_{90}$ (laser) ranging from about 5 μm to about 380 μm or from about 5 μm to about 360 μm or from about 5 μm to about 350 μm or from about 5 μm to about 340 μm or from about 5 μm to about 320 μm or from about 5 μm to about 300 μm or from about 5 μm to about 280 μm or from about 5 μm to about 260 μm or from about 5 μm to about 250 μm or from about 5 μm to about 240 μm or from about 5 μm to about 220 μm or from about 5 μm to about 200 μm or from about 5 μm to about 180 μm or from about 5 μm to about 160 μm or from about 5 μm to about 150 μm or from about 5 μm to about 140 μm or from about 5 μm to about 120 μm or from about 5 μm to about 100 μm or from about 5 μm to about 80 μm or from about μm to about 60 μm or from about 5 μm to about 50 μm. For example, the high aspect ratio particulate mineral may have a $d_{90}$ (laser) ranging from about 10 μm to about 380 μm or from about 10 μm to about 360 μm or from about 10 μm to about 350 μm or from about 10 μm to about 340 μm or from about 10 μm to about 320 μm or from about 10 μm to about 300 μm or from about 10 μm to about 280 μm or from about 10 μm to about 260 μm or from about 10 μm to about 250 μm or from about 10 μm to about 240 μm or from about 10 μm to about 220 μm or from about 10 μm to about 200 μm or from about 10 μm to about 180 μm or from about 10 μm to about 160 μm or from about 10 μm to about 150 μm or from about 10 μm to about 140 μm or from about 10 μm to about 120 μm or from about 10 μm to about 100 μm or from about 10 μm to about 80 μm or from about 10 μm to about 60 μm or from about 10 μm to about 50 μm. For example, the high aspect ratio particulate mineral may have a $d_{90}$ (laser) ranging from about 20 μm to about 380 μm or from about 20 μm to about 360 μm or from about 20 μm to about 350 μm or from about 20 μm to about 340 μm or from about 20 μm to about 320 μm or from about 20 μm to about 300 μm or from about 20 μm to about 280 μm or from about 20 μm to about 260 μm or from about 20 μm to about 250 μm or from about 20 μm to about 240 μm or from about 20 μm to about 220 μm or from about 20 μm to about 200 μm or from about 20 μm to about 180 μm or from about 20 μm to about 160 μm or from about 20 μm to about 150 μm or from about 20 μm to about 140 μm or from about 20 μm to about 120 μm or from about 20 μm to about 100 μm or from about 20 μm to about 80 μm or from about 20 μm to about 60 μm or from about 20 μm to about 50 μm.

The high aspect ratio particulate mineral may, for example, have a $d_{90}$ (laser) ranging from about 20 μm to about 70 μm. For example, the high aspect ratio particulate mineral may have a $d_{90}$ (laser) ranging from about 25 μm to about 65 μm or from about 30 μm to about 60 μm or from about 35 μm to about 55 μm or from about 40 μm to about 50 μm or from about 45 μm to about 50 μm.

The high aspect ratio particulate mineral may, for example, have a $d_{95}$ (laser) ranging from about 5 μm to about 450 μm. For example, the high aspect ratio particulate mineral may have a $d_{95}$ (laser) ranging from about 5 μm to about 440 μm or from about 5 μm to about 420 μm or from about 5 μm to about 400 μm or from about 5 μm to about 380 μm or from about 5 μm to about 360 μm or from about 5 μm to about 350 μm or from about 5 μm to about 340 μm or from about 5 μm to about 320 μm or from about 5 μm to about 300 μm or from about 5 μm to about 280 μm or from about 5 μm to about 260 μm or from about 5 μm to about 250 μm or from about 5 μm to about 240 μm or from about 5 μm to about 220 μm or from about 5 μm to about 200 μm or from about 5 μm to about 180 μm or from about 5 μm to about 160 μm or from about 5 μm to about 150 μm or from about 5 μm to about 140 μm or from about 5 μm to about 120 μm or from about 5 μm to about 100 μm or from about 5 μm to about 80 μm or from about μm to about 60 μm or from about 5 μm to about 50 μm. For example, the high aspect ratio particulate mineral may have a $d_{95}$ (laser) ranging from about 10 μm to about 440 μm or from about 10 μm to about 420 μm or from about 10 μm to about 400 μm about 10 μm to about 380 μm or from about 10 μm to about 360 μm or from about 10 μm to about 350 μm or from about 10 μm to about 340 μm or from about 10 μm to about 320 μm or from about 10 μm to about 300 μm or from about 10 μm to about 280 μm or from about 10 μm to about 260 μm or from about 10 μm to about 250 μm or from about 10 μm to about 240 μm or from about 10 μm to about 220 μm or from about 10 μm to about 200 μm or from about 10 μm to about 180 μm or from about 10 μm to about 160 μm or from about 10 μm to about 150 μm or from about 10 μm to about 140 μm or from about 10 μm to about 120 μm or from about 10 μm to about 100 μm or from about 10 μm to about 80 μm or from about 10 μm to about 60 μm or from about 10 μm to about 50 μm. For example, the high aspect ratio particulate mineral may have a $d_{95}$ (laser) ranging from about 20 μm to about 440 μm or from about 20 μm to about 420 μm or from about 20 μm to about 400 μm about 20 μm to about 380 μm or from about 20 μm to about 360 μm or from about 20 μm to about 350 μm or from about 20 μm to about 340 μm or from about 20 μm to about 320 μm or from about 20 μm to about 300 μm or from about 20 μm to about 280 μm or from about 20 μm to about 260 μm or from about 20 μm to about 250 μm or from about 20 μm to about 240 μm or from about 20 μm to about 220 μm or from about 20 μm to about 200 μm or from about 20 μm to about 180 μm or from about 20 μm to about 160 μm or from about 20 μm to about 150 μm or from about 20 μm to about 140 μm or from about 20 μm to about 120 μm or from about 20 μm to about 100 μm or from about 20 μm to about 80 μm or from about 20 μm to about 60 μm or from about 20 μm to about 50 μm.

The high aspect ratio particulate mineral may, for example, have a $d_{95}$ (laser) ranging from about 20 μm to about 80 μm. For example, the high aspect ratio particulate mineral may have a $d_{95}$ (laser) ranging from about 25 μm to about 75 μm or from about 30 μm to about 70 μm or from about 35 μm to about 65 μm or from about 40 μm to about 60 μm or from about 45 μm to about 55 μm or from about 50 μm to about 55 μm.

The high aspect ratio particulate mineral (e.g. lamellar mineral such as talc) may, for example, have a lamellarity index equal to or greater than about 2.8. For example, the high aspect ratio particulate mineral (e.g. lamellar mineral such as talc) may have a lamellarity index equal to or greater than about 2.9 or equal to or greater than about 3.0 or equal to or greater than about 3.1 or equal to or greater than about 3.2 or equal to or greater than about 3.3 or equal to or greater than about 3.4 or equal to or greater than about 3.5 or equal to or greater than about 3.6 or equal to or greater than about 3.7 or equal to or greater than about 3.8 or equal to or greater than about 3.9 or equal to or greater than about 4 or equal to or greater than about 4.1 or equal to or greater than about 4.2 or equal to or greater than about 4.3 or equal to or greater than about 4.4 or equal to or greater than about 4.5 or equal to or greater than about 4.6 or equal to or greater than about 4.7 or equal to or greater than about 4.8 or equal to or greater than about 4.9 or equal to or greater than about 5 or equal to or greater than about 5.1 or equal to or greater than about 5.2 or equal to or greater than about 5.3 or equal to or greater than about 5.4 or equal to or greater than about 5.5 or equal to or greater than about 5.6 or equal to or greater than about 5.7 or equal to or greater than about 5.8 or equal to or greater than about 5.9 or equal to or greater than about 6 or equal to or greater than about 6.1 or equal to or greater than about 6.2 or equal to or greater than about 6.3 or equal to or greater than about 6.4 or equal to or greater than about 6.5 or equal to or greater than about 6.6 or equal to or greater than about 6.7 or equal to or greater than about 6.8 or equal to or greater than about 6.9 or equal to or greater than about 7.

The high aspect ratio particulate mineral (e.g. lamellar mineral such as talc) may, for example, have a lamellarity index equal to or less than about 20. For example, the high aspect ratio particulate mineral (e.g. talc) may have a lamellarity index equal to or less than about 15 or equal to or less than about 10 or equal to or less than about 9.5 or equal to or less than about 9 or equal to or less than about 8.5 or equal to or less than about 8 or equal to or less than about 7.5.

Lamellarity index characterizes the shape and flatness of particles (large dimension/thickness). The term "lamellarity index" is defined by the following ratio:

$$\frac{d_{50laser} - d_{50sedi}}{d_{50sedi}}$$

in which "$d_{50laser}$" is the value of the mean particle size ($d_{50}$) obtained using a laser particle size analyser as described herein and "$d_{50sedi}$" is the value of the median diameter obtained by sedimentation using a sedigraph (standard ISO 13317-3), as described herein. Reference may be made to the article by G. Baudet and J. P. Rona, Ind. Min. Mines et Carr. Les techn. June, July 1990, pp 55-61, which shows that this index is correlated to the mean ratio of the largest dimension of the particle to its smallest dimension.

In the sedimentation technique referred to above, particle size properties referred to herein for the talc particulate materials are as measured in a well-known manner by sedimentation of the particulate material in a fully dispersed condition in an aqueous medium using a Sedigraph 5100 machine as supplied by Micromeritics Instruments Corporation, Norcross, Ga., USA (www.micromeritics.com), referred to herein as a "Micromeritics Sedigraph 5100 unit", and based on application of Stokes' Law. Such a machine provides measurements and a plot of the cumulative percentage by weight of particles having a size, referred to in the art as the 'equivalent spherical diameter' (e.s.d), less than given e.s.d values. The mean particle size $d_{50sedi}$ is the value determined in this way of the particle e.s.d at which there are 50% by weight of the particles which have an equivalent spherical diameter less than that $d_{50}$ value. The $d_{95sedi}$ value is the value at which 95% by weight of the particles have an esd less than that $d_{95sedi}$ value. Particle size properties may be determined in accordance with ISO 13317-3, or any method equivalent thereto. The particle size ranges measured by sedigraph may, for example, relate to lamellar particulate minerals. The particle size ranges measured by sedigraph may, for example, relate to talc.

In the laser technique referred to above, particle size properties referred to herein for the particulate talc materials are measured by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S (as supplied by Malvern instruments) provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by weight of the particles which have an equivalent spherical diameter less than that $d_{50}$ value. For the avoidance of doubt, the measurement of particle size using laser light scattering is not an equivalent method to the sedimentation method referred to above. The particle size ranges measured by the laser technique may, for example, relate to acicular minerals. The particle size ranges measured by the laser technique may, for example, relate to wollastonite and/or halloysite.

As used herein, $d_{50}$ (sedigraph) and $d_{50}$ (laser) refer to the $d_{50}$ values measured respectively, according to the sedigraph or laser techniques described above.

In certain embodiments, the high aspect ratio particulate mineral is talc having a $d_{50}$ (sedigraph) ranging from about 0.5 μm to about 20 μm. In certain embodiments, the talc further has a $d_{95}$ (sedigraph) ranging from about 3 μm to about 150 μm, for example from about 3 μm to about 100 μm or from about 3 μm to about 50 μm or from about 3 μm to about 25 μm.

In certain embodiments, the high aspect ratio particulate mineral is talc having a $d_{10}$ (sedigraph) ranging from about 0.2 μm to about 0.8 μm and a $d_{50}$ (sedigraph) ranging from about 2 μm to about 3.5 μm. In certain embodiments, the high aspect ratio particulate mineral (talc) further has a $d_{95}$ (sedigraph) ranging from about 5 μm to about 25 μm. In certain embodiments, the high aspect ratio particulate mineral (talc) further has a $d_{95}$ (sedigraph) ranging from about 5 μm to about 15 μm and a lamellarity index ranging from about 3 to about 4. In certain embodiments, the high aspect ratio particulate mineral (talc) further has a $d_{95}$ (sedigraph) ranging from about 15 μm to about 25 μm and a lamellarity index ranging from about 5 to about 9.

In certain embodiments, the high aspect ratio particulate mineral is talc having a $d_{10}$ (laser) ranging from about 2 μm to about 8 μm and a $d_{50}$ (laser) ranging from about 8 μm to about 25 μm. In certain embodiments, the high aspect ratio particulate mineral (talc) further has a $d_{95}$ (laser) ranging from about 25 μm to about 65 μm. In certain embodiments, the high aspect ratio particulate mineral (talc) has a $d_{50}$ (laser) ranging from about 8 μm to about 15 μm and a $d_{95}$ (laser) ranging from about 20 μm to about 30. In certain embodiments, the high aspect ratio particulate mineral (talc) has a $d_{50}$ (laser) ranging from about 8 μm to about 15 μm and a $d_{95}$ (laser) ranging from about 20 μm to about 30 and a lamellarity index ranging from about 3 to about 5. In certain embodiments, the high aspect ratio particulate mineral (talc) has a $d_{50}$ (laser) ranging from about 8 μm to about 15 μm and a $d_{95}$ (laser) ranging from about 25 μm to about 35 μm and/or a lamellarity index ranging from about 3 to about 4. In certain embodiments, the high aspect ratio particulate mineral (talc) has a $d_{50}$ (laser) ranging from about 15 μm to about 30 μm (e.g. from about 15 μm to about 25 μm) and a $d_{95}$ (laser) ranging from about 50 μm to about 70 μm (e.g. from about 55 μm to about 65 μm) and/or a lamellarity index ranging from about 5 to about 9.

In certain embodiments, the high aspect ratio particulate mineral is talc having a $d_{50}$ (sedigraph) ranging from about 1 μm to about 8 μm (e.g. from about 2 μm to about 8 μm) and BET surface area of at least about 10 m²/g. In certain embodiments, the high aspect ratio particulate mineral is talc having a $d_{50}$ (sedigraph) ranging from about 8 μm to about 15 μm and a BET surface area of at least about 5 m²/g. In certain embodiments, the high aspect ratio particulate mineral is talc having a $d_{50}$ (sedigraph) ranging from about 1 μm to about 8 μm (e.g. from about 2 μm to about 8 μm) and a lamellarity index of at least about 3.

In certain embodiments, the high aspect ratio particulate mineral is wollastonite having a $d_{50}$ (laser) ranging from about 5 μm to about 100 μm. In certain embodiments, the wollastonite further has a $d_{95}$ (laser) ranging from about 10 μm to about 150 or from about 10 μm to about 100 μm or from about 10 μm to about 50 μm.

In certain embodiments, the high aspect ratio particulate mineral is wollastonite having a $d_{50}$ (laser) ranging from about 4 μm to about 10 μm. In certain embodiments, the wollastonite further has a $d_{95}$ (laser) ranging from about 30 μm to about 40 μm. In certain embodiments, the wollastonite further has a $d_{10}$ (laser) ranging from about 0.5 μm to about 3 μm. In certain embodiments, the wollastonite further has an aspect ratio ranging from about 4 to about 10. In certain embodiments, the wollastonite further has a $d_{95}$ (laser) ranging from about 30 μm to about 40 μm and a $d_{10}$ (laser) ranging from about 0.5 μm to about 3 μm and an aspect ratio ranging from about 4 to about 10. In certain embodiments, the wollastonite further has a BET surface area ranging from about 0.5 to about 5 $m^2/g$.

In certain embodiments, the high aspect ratio particulate mineral is mica having a $d_{50}$ (laser) ranging from about 5 μm to about 200 μm, for example from about 5 μm to about 150 μm or from about 5 μm to about 100 μm or from about 5 μm to about 50 μm. In certain embodiments, the mica further has a $d_{95}$ (laser) ranging from about 10 μm to about 400 μm, for example from about 10 μm to about 350 μm or from about 10 μm to about 300 μm or from about 10 μm to about 250 μm or from about 10 μm to about 200 μm or from about 10 μm to about 150 μm or from about 10 μm to about 100 μm or from about 10 μm to about 50 μm. In certain embodiments, the mica has a $d_{50}$ (laser) ranging from about 5 μm to about 200 μm and a $d_{95}$ (laser) ranging from about 10 μm to about 400 μm. In certain embodiments, the mica has a $d_{50}$ (laser) ranging from about 5 μm to about 50 μm and a $d_{95}$ (laser) ranging from about 10 μm to about 50 μm. In certain embodiments, the mica further has a BET surface area ranging from about 0.5 $m^2/g$ to about 5 $m^2/g$.

In certain embodiments, the high aspect ratio particulate mineral is mica having a $d_{50}$ (sedigraph) ranging from about 1 μm to about 9 μm or ranging from about 2 μm to about 8 μm or ranging from about 3 μm to about 7 μm. In certain embodiments, the mica further has a $d_{90}$ (sedigraph) ranging from about 20 μm to about 35 μm. In certain embodiments, the mica further has a $d_{10}$ (sedigraph) ranging from about 0.05 μm to about 2 μm.

In certain embodiments, the high aspect ratio particulate mineral is halloysite having a $d_{50}$ (sedigraph) ranging from about 0.1 μm to about 2 μm or from about 0.1 μm to about 1 μm. In certain embodiments, the halloysite further has a $d_{90}$ (sedigraph) ranging from about 3 μm to about 10 μm or from about 3 μm to about 8 μm. In certain embodiments, the halloysite further has a BET surface area ranging from about 50 $m^2/g$ to about 80 $m^2/g$. In certain embodiments, the halloysite further has an aspect ratio ranging from about 5 to about 25 or from about 10 to about 20.

In certain embodiments, the particle size of halloysite may be measured by scanning electron microscopy. SEM may, for example, provide measurements for the length, inside diameter and outside diameter of the halloysite particles. In certain embodiments, the halloysite has a particle length ranging from about 0.1 μm to about 3 μm or from about 0.1 μm to about 2.5 μm or from about 0.5 μm to about 2 μm. In certain embodiments, the halloysite has an outside diameter ranging from about 30 nm to about 90 nm or from about 40 nm to about 60 nm or from about 50 nm to about 70 nm. In certain embodiments, the halloysite has an inside diameter ranging from about 5 nm to about 55 nm or from about 10 nm to about 50 nm or from about 15 nm to about 45 nm. In certain embodiments, the halloysite further has an aspect ratio ranging from about 5 to about 25 or from about 10 to about 20.

In certain embodiments, the halloysite has a particle length ranging from about 0.5 μm to about 2 μm, an outside diameter ranging from about 50 nm to about 70 nm and an inside diameter ranging from about 15 nm to about 45 nm. In certain embodiment, the halloysite further has an aspect ratio ranging from about 10 to about 20.

The high aspect ratio particulate mineral may, for example, have a BET surface area equal to or greater than about 0.5 $m^2/g$. For example, the high aspect ratio particulate mineral may have a BET surface area equal or greater than about 1 $m^2/g$ or equal to or greater than about 2 $m^2/g$ or equal to or greater than about 3 $m^2/g$ or equal to or greater than about 4 $m^2/g$ or equal to or greater than about 5 $m^2/g$ or equal to or greater than about 6 $m^2/g$ or equal to or greater than about 7 $m^2/g$ or equal to or greater than about 8 $m^2/g$ or equal to or greater than about 9 $m^2/g$ or equal to or greater than about 10 $m^2/g$. In certain embodiments, the high aspect ratio particulate mineral has a BET surface area equal to or greater than about 10 $m^2/g$ or equal to or greater than about 11 $m^2/g$ or equal to or greater than about 12 $m^2/g$ or equal to or greater than about 13 $m^2/g$ or equal to or greater than about 14 $m^2/g$ or equal to or greater than about 15 $m^2/g$.

The high aspect ratio particulate mineral may, for example, have a BET surface area equal to or less than about 100 $m^2/g$. For example, the high aspect ratio particulate mineral may have a BET surface area equal to or less than about 90 $m^2/g$ or equal to or less than about 80 $m^2/g$ or equal to or less than about 70 $m^2/g$ or equal to or less than about 60 $m^2/g$ or equal to or less than about 50 $m^2/g$ or equal to or less than about 40 $m^2/g$. In certain embodiments, the high aspect ratio particulate mineral has a BET surface area equal to or less than about 30 $m^2/g$. For example, the high aspect ratio particulate mineral may have a BET surface area equal to or less than about 25 $m^2/g$ or equal to or less than about 24 $m^2/g$ or equal to or less than about 23 $m^2/g$ or equal to or less than about 22 $m^2/g$ or equal to or less than about 21 $m^2/g$ or equal to or less than about 20 $m^2/g$.

The high aspect ratio particulate mineral may, for example, have a BET surface area ranging from about 1 $m^2/g$ to about 100 $m^2/g$ or from about 1 $m^2/g$ to about 80 $m^2/g$ or from about 1 $m^2/g$ to about 70 $m^2/g$ or from about 1 $m^2/g$ to about 30 $m^2/g$ or from about 1 $m^2/g$ to about 25 $m^2/g$ or from about 10 $m^2/g$ to about 25 $m^2/g$ or from about 10 $m^2/g$ to about 20 $m^2/g$.

In certain embodiments, the high aspect ratio particulate mineral is talc having a BET surface area ranging from about 2 $m^2/g$ to about 22 $m^2/g$. For example, the high aspect ratio particulate mineral may be talc having a BET surface area ranging from about 4 $m^2/g$ to about 20 $m^2/g$ or from about 6 $m^2/g$ to about 18 $m^2/g$ or from about 8 $m^2/g$ to about 16 $m^2/g$ or from about 10 $m^2/g$ to about 15 $m^2/g$.

In certain embodiments, the high aspect ratio particulate mineral is a microcrystalline talc having a BET surface area ranging from about 8 $m^2/g$ to about 22 $m^2/g$. In certain embodiments, the high aspect ratio particulate mineral is microcrystalline talc having a BET surface area ranging from about 10 $m^2/g$ to about 20 $m^2/g$ or from about 12 $m^2/g$ to about 18 $m^2/g$ or from about 14 $m^2/g$ to about 16 $m^2/g$.

In certain embodiments, the high aspect ratio particulate mineral is a macrocrystalline talc having a BET surface area ranging from about 2 $m^2/g$ to about 18 $m^2/g$. For example, the macrocrystalline talc may have a BET surface area ranging from about 4 m²/g to about 17 m²/g or from about 6 m²/g to about 16 m²/g or from about 8 m²/g to about 15 m²/g or from about 10 m²/g to about 14 m²/g. For example, the macrocrystalline talc may have a BET surface area ranging from about 10 m²/g to about 18 m²/g or from about 12 m²/g to about 18 m²/g or from about 14 m²/g to about 16 m²/g.

In certain embodiments, the high aspect ratio particulate mineral is talc having a BET surface area ranging from about 10 m²/g to about 30 m²/g or from about 10 m²/g to about 25 m²/g or from about 10 m²/g to about 20 m²/g. In certain embodiments, the high aspect ratio particulate mineral is mica having a BET surface area ranging from about 5 m²/g to about 20 m²/g or from about 5 m²/g to about 15 m²/g or from about 5 m²/g to about 10 m²/g. In certain embodiments, the high aspect ratio particulate mineral is wollastonite having a BET surface area ranging from about 1 m²/g to about 10 m²/g or from about 1 m²/g to about 5 m²/g or from about 1 m²/g to about 3 m²/g.

In certain embodiments, the high aspect ratio particulate mineral is mica having a BET surface area ranging from about 0.5 m²/g to about 5 m²/g. For example, the mica may have a BET surface area ranging from about 1 m²/g to about 4 m²/g or from about 1.5 m²/g to about 3.5 m²/g or from about 2 m²/g to about 2.5 m²/g.

In certain embodiments, the high aspect ratio particulate mineral is wollastonite having a BET surface area ranging from about 0.5 m²/g to about 5 m²/g. For example, the woolastonite may have a BET surface area ranging from about 1 m²/g to about 4 m²/g or from about 1.5 m²/g to about 3.5 m²/g or from about 2 m²/g to about 2.5 m²/g.

In certain embodiments, the high aspect ratio particulate mineral is halloysite having a BET surface area ranging from about 10 m²/g to about 30 m²/g or from about 15 m²/g to about 25 m²/g or from about 18 m²/g to about 22 m²/g.

As used herein, "BET surface area" refers to the area of the surface of the particles of the particulate talc material with respect to unit mass, determined according to the BET method by the quantity of nitrogen adsorbed on the surface of said particles so as to form a monomolecular layer completely covering said surface (measurement according to the BET method. AFNOR standard X11-621 and 622 or ISO 9277). In certain embodiments, BET surface area is determined in accordance with ISO 9277 or any method equivalent thereto.

The high aspect ratio particulate mineral may, for example, be present in the flame-retardant polymer composition in an amount of at least about 5% based on the total weight of the flame-retardant polymer composition. For example, the high aspect ratio particulate mineral may be present in the flame-retardant polymer composition in an amount of at least about 5.5 wt % or at least about 6 wt % or at least about 6.5 wt % or at least about 7 wt % or at least about 7.5 wt % or at least about 8 wt % or at least about 8.5 wt % or at least about 9 wt % or at least about 9.5 wt % or at least about 10 wt % based on the total weight of the flame-retardant polymer composition.

The high aspect ratio particulate mineral may, for example, be present in the flame-retardant polymer composition in an amount up to about 25% based on the total weight of the flame-retardant polymer composition. For example, the high aspect ratio particulate mineral may be present in the flame-retardant polymer composition in an amount up to about 24 wt % or up to about 23 wt % or up to about 22 wt % or up to about 21 wt % or up to about 20 wt % or up to about 19 wt % or up to about 18 wt % or up to about 17 wt % or up to about 16 wt % or up to about 15 wt % based on the total weight of the flame-retardant polymer composition.

For example, the high aspect ratio particulate mineral may be present in the flame-retardant polymer composition in an amount ranging from about 5 wt % to about 25 wt % or from about 10 wt % to about 20 wt % or from about 12 wt % to about 18 wt % or from about 13 wt % to about 16 wt % based on the total weight of the flame-retardant polymer composition.

In certain embodiments, the flame-retardant polymer composition further comprises a reinforcing material. In certain embodiments, the flame-retardant polymer composition does not comprise a reinforcing material.

The term "reinforcing material" refers to any material that can strengthen the polymer composition (e.g. improve the tensile and flexural modulus and/or tensile and flexural strength).

The reinforcing material may, for example, be reinforcing fibres. The reinforcing material may, for example, be glass fibres, carbon fibres, aramid fibres (e.g. Kevlar®, Nomex®, Technora®), wood fibres, basalt fibres or combinations of one or more thereof. In certain embodiments, the reinforcing material is glass fibres, carbon fibres or a combination thereof. Hereinafter, the present invention may tend to be discussed in terms of glass fibres. However, the invention should not be construed as being limited to such embodiments.

The reinforcing fibres may, for example, be wound into threads having a larger diameter than the fibres before incorporation in the flame-retardant polymer composition.

The reinforcing fibres (e.g. glass fibres or carbon fibre filaments) may, for example, have a diameter ranging from about 6 μm to about 20 μm. For example, the reinforcing fibres (e.g. glass fibres) may have a diameter ranging from about 6 μm to about 19 μm or from about 6 μm to about 18 μm or from about 6 μm to about 17 μm or from about 6 μm to about 16 μm or from about 6 μm to about 15 μm or from about 6 μm to about 14 μm. For example, the reinforcing fibres (e.g. glass fibres) may have a diameter ranging from about 6.5 μm to about 13.5 μm or from about 7 μm to about 13 μm or from about 7.5 μm to about 12.5 μm or from about 8 μm to about 12 μm or from about 8.5 μm to about 11.5 μm or from about 9 μm to about 11 μm.

The reinforcing fibres (e.g. glass fibres or carbon fibre filaments) may, for example, have a length ranging from about 3 mm to about 8 mm. For example, the reinforcing fibres (e.g. glass fibres) may have a length ranging from about 3 mm to about 5 mm or from about 3.5 mm to about 7.5 mm or from about 4 mm to about 7 mm or from about 4.5 mm to about 6.5 mm or from about 5 mm to about 6 mm.

Carbon fibres may, for example, be bundled such that each bundle comprises from about 1000 to about 100,000 carbon fibre filaments. For example, each bundle may comprise from about 2000 to about 80,000 or from about 3000 to about 50,000 or from about 4000 to about 25,000 or from about 5000 to about 20,000 carbon fibre filaments.

When present, the reinforcing material may, for example, be present in the flame-retardant polymer composition in an amount of at least about 1% based on the total weight of the flame-retardant polymer composition. For example, the reinforcing material may be present in the flame-retardant polymer composition in an amount of at least about 2 wt % or at least about 3 wt % or at least about 4 wt % or at least about 5 wt % or at least about 6 wt % or at least about 8 wt % or at least about 10 wt % or at least about 12 wt % or at least about 14 wt % or at least about 15 wt % or at least about 16 wt % or at least about 18 wt % or at least about 20 wt % based on the total weight of the flame-retardant polymer composition.

When present, the reinforcing material may, for example, be present in the flame-retardant polymer composition in an amount up to about 50% based on the total weight of the flame-retardant polymer composition. For example, the reinforcing material may be present in the flame-retardant polymer composition in an amount up to about 45 wt % or up to about 40 wt % or up to about 38 wt % or up to about 36 wt % or up to about 35 wt % or up to about 34 wt % or up to about 32 wt % or up to about 30 wt % or up to about 28 wt % or up to about 26 wt % or up to about 25 wt % based on the total weight of the flame-retardant polymer composition.

For example, the reinforcing material may be present in the flame-retardant polymer composition in an amount ranging from about 1 wt % to about 50 wt % or from about 5 wt % to about 45 wt % or from about 10 wt % to about 40 wt % or from about 15 wt % to about 35 wt % or from about 15 wt % to about 30 wt % or from about 15 wt % to about 25 wt % based on the total weight of the flame-retardant polymer composition.

The flame-retardant polymer composition may, for example, comprise further additives. For example, the flame-retardant polymer composition may further comprise one or more of coupling agents (e.g. maleic anhydride grafted polyolefins), compatibilizers (e.g. maleic anhydride grafted polyolefins), opacifying agents, pigments, colorants, slip agents (for example Erucamide), antioxidants, anti-fog agents, anti-static agents, anti-block agents, moisture barrier additives, gas barrier additives, dispersants, hydrocarbon waxes, stabilizers, co-stabilizers, lubricants, agents to improve tenacity, agents to improve heat-and-form stability, agents to improve processing performance, process aids (for example Polybatch® RMF-705), mould release agents (e.g. fatty acids, zinc, calcium, magnesium, lithium salts of fatty acids, organic phosphate esters, stearic acid, zinc stearate, calcium stearate, magnesium stearate, lithium stearate, calcium oleate, zinc palmiate), antioxidants and plasticizers.

Each of the further additives may independently be present in the flame-retardant polymer composition in an amount ranging from about 0% to about 2% based on the total weight of the flame-retardant polymer composition. For example, each of the further additives may be present in the flame-retardant polymer composition in an amount ranging from about 0% to about 1.5% or from about 0% to about 1% or from about 0% to about 0.5%. The flame-retardant polymer composition may, for example, comprise no more than about 10 wt % or no more than about 5 wt % or no more than about 4 wt % or no more than about 3 wt % or no more than about 2 wt % of further additives based on the total weight of the flame-retardant polymer composition.

Each of the components of the flame-retardant polymer composition disclosed herein may be present in any amount within the ranges specified herein provided that the total wt % of the flame-retardant polymer composition is 100 wt %.

The flame-retardant polymer composition may, for example, have a flame-retardancy rating equal to or greater than V-2 when measured using the UL94 standard. For example, the flame-retardant polymer composition may have a flame-retardancy rating equal to or greater than V-1 when measured using the UL94 standard. For example, the flame-retardant polymer composition may have a flame-retardancy rating of V-0 when measured using the UL94 standard. For example, the flame-retardant polymer composition may have a maximum flame-retardancy rating of V-0 when measured using the UL94 standard. The flame-retardancy ratings may, for example, be measured using compositions having a thickness of ⅛ inch (about 3 mm), 1/16 inch (about 1.5 mm) and/or 1/32 inch (about 0.8 mm).

The flame-retardant polymer composition may, for example, have a flame-retardancy rating of V-0 when the flame-retardant polymer composition comprises equal to or greater than about 15 wt % flame retardant and when measured using the UL94 standard at a thickness of ⅛ inch (about 3 mm) and/or 1/16 inch (about 1.5 mm). The flame retardant may, for example, be ATH and/or MDH.

The flame-retardant polymer composition may, for example, have a flame-retardancy rating of V-0 when the flame-retardant polymer composition comprises equal to or greater than about 10 wt % flame retardant and equal to or greater than about 10 wt % high aspect ratio talc and when measured using the UL94 standard at a thickness of ⅛ inch (about 3 mm). The flame-retardant polymer composition may, for example, comprise from about 10 wt % to about 14.5 wt % flame retardant. The polymer composition may, for example, comprise equal to or greater than about 20 wt % reinforcing material (e.g. glass fibers). The flame retardant may, for example, be ATH and/or MDH.

The flame-retardant polymer composition may, for example, have a flame-retardancy rating of V-1 when the flame-retardant polymer composition comprises equal to or greater than about 10 wt % flame retardant and equal to or greater than about 10 wt % high aspect ratio mica and when measured using the UL94 standard at a thickness of ⅛ inch (about 3 mm). The flame-retardant polymer composition may, for example, comprise from about 10 wt % to about 14.5 wt % flame retardant. The polymer composition may, for example, comprise equal to or greater than about 20 wt % reinforcing material (e.g. glass fibers). The flame retardant may, for example, be ATH and/or MDH.

The flame-retardant polymer composition may, for example, have a flame-retardancy rating of V-1 when the flame-retardant polymer composition comprises equal to or greater than about 12.5 wt % flame retardant and equal to or greater than about 10 wt % high aspect ratio mica or 10 wt % high aspect ratio talc and when measured using the UL94 standard at a thickness of 1/16 inch (about 1.5 mm). The polymer composition may, for example, comprise equal to or greater than about 20 wt % reinforcing material (e.g. glass fibers). The flame retardant may, for example, be ATH and/or MDH.

The flame-retardant polymer composition may, for example, have a flame-retardancy rating of V-0 when the flame-retardant polymer composition comprises equal to or greater than about 17.5 wt % flame retardant and when measured using the UL94 standard at a thickness of 1/32 inch (about 0.8 mm). The polymer composition may, for example, comprise equal to or greater than about 10 wt % high aspect ratio wollastonite. The polymer composition may, for example, comprise equal to or greater than about 20 wt % reinforcing material (e.g. glass fibers) in addition to the 10 wt % high aspect ratio wollastonite. Alternatively, the polymer composition may, for example, comprise equal to or greater than about 30 wt % reinforcing material (e.g. glass fibers). The flame retardant may, for example, be ATH and/or MDH.

The flame-retardant polymer composition may, for example, have a flame-retardancy rating of V-1 when the flame-retardant polymer composition comprises equal to or greater than about 12.5 wt % flame retardant and 10 wt % high aspect ratio talc and when measured using the UL94 standard at a thickness of 1/32 inch (about 0.8 mm). The polymer composition may, for example, further comprise equal to or greater than about 20 wt % reinforcing material (e.g. glass fibers). The flame retardant may, for example, be ATH and/or MDH.

The flame-retardant polymer composition may, for example, have a flame-retardancy rating of V-2 when the flame-retardant polymer composition comprises equal to or greater than about 12.5 wt % flame retardant and 10 wt % high aspect ratio mica and when measured using the UL94 standard at a thickness of 1/32 inch (about 0.8 mm). The polymer composition may, for example, further comprise equal to or greater than about 20 wt % reinforcing material (e.g. glass fibers). The flame retardant may, for example, be ATH and/or MDH.

The flame-retardant polymer composition may, for example, have a flame-retardancy rating of V-1 when the flame-retardant polymer composition comprises equal to or greater than about 15 wt % flame retardant and 10 wt % high aspect ratio wollastonite or 10 wt % high aspect ratio mica and when measured using the UL94 standard at a thickness of 1/32 inch (about 0.8 mm). The polymer composition may, for example, further comprise equal to or greater than about 20 wt % reinforcing material (e.g. glass fibers). The flame retardant may, for example, be ATH and/or MDH.

The flame-retardant polymer composition may, for example, have a limiting oxygen index (LOI) ranging from about 22% to about 35%. For example, the flame-retardant polymer composition may have a LOI ranging from about 23% to about 34% or from about 24% to about 33% or from about 25% to about 32% or from about 26% to about 31% or from about 27% to about 30% or from about 28% to about 29%. Limiting oxygen index (LOI) may, for example, be measured by the ISO 4589 and/or ASTM D2863 tests.

The flame-retardant polymer composition may, for example, have a flame-retardancy rating that is equal to or greater than the flame-retardancy rating of a comparative composition that is identical except that it does not comprise the high aspect ratio particulate mineral. This may, for example, be measured by the UL94 standard.

The flame-retardant polymer composition may, for example, have a flame-retardancy rating that is equal to or greater than the flame-retardancy rating of a comparative composition that is identical except that it comprises an additional amount of the reinforcing material in place of the high aspect ratio particulate mineral. The comparative composition is identical in every sense except that the high aspect ratio particulate mineral is replaced by the same amount of reinforcing material so that the total loading of the reinforcing material and high aspect ratio particulate mineral remains unchanged.

The flame-retardant polymer composition may, for example, comprise equal to or less than about 15% of the flame retardant based on the total weight of the flame-retardant polymer composition. For example, the flame-retardant polymer composition may comprise equal to or less than about 14 wt % or equal to or less than about 13 wt % or equal to or less than about 12 wt % or equal to or less than about 11 wt % or equal to or less than about 10 wt % of the flame retardant based on the total weight of the flame-retardant polymer composition.

The flame-retardant polymer composition may, for example, have a flexural modulus ranging from about 2000 MPa to about 16,000 MPa. For example, the flame-retardant polymer composition may have a flexural modulus ranging from about 2500 MPa to about 15,500 MPa or from about 3000 MPa to about 15,000 MPa or from about 3500 MPa to about 14,500 MPa or from about 4000 MPa to about 14,000 MPa or from about 4500 MPa to about 13,500 MPa or from about 5000 MPa to about 13,000 MPa or from about 5500 MPa to about 12,500 MPa or from about 6000 MPa to about 12,000 MPa or from about 6500 MPa to about 11,500 MPa or from about 7000 MPa to about 11,000 MPa or from about 7500 MPa to about 10,500 MPa or from about 8000 MPa to about 10,000 MPa or from about 8500 MPa to about 9500 MPa. For example, the flame-retardant polymer composition may have a flexural modulus ranging from about 7000 MPa to about 11,000 MPa. For example, the flame-retardant polymer composition may have a flexural modulus ranging from about 7000 MPa to about 8000 MPa. For example, the flame-retardant polymer composition may have a flexural modulus ranging from about 9000 MPa to about 11,000 MPa. For example, the flame-retardant polymer composition may have a flexural modulus ranging from about 7000 Mpa to about 11,000 MPa. For example, the flame-retardant polymer composition may have a flexural modulus equal to or greater than about 5000 Mpa or equal to or greater than about 5500 MPa or equal to or greater than about 6000 MPa or equal to or greater than about 6500 Mpa or equal to or greater than about 7000 MPa. Flexural modulus may, for example, be measured by ISO 178 (at 64 mm span and 2 mm/min speed).

The flame-retardant polymer composition may, for example, have a flexural modulus that is within (i.e. + or −) about 20% of the flexural modulus of a comparative composition that is identical except that it does not comprise the high aspect ratio particulate mineral. In certain embodiments, the flexural modulus is within about 18% or within about 16% or within about 15% or within about 14% or within about 12% or within about 10% or within about 8% or within about 6% or within about 5% of the flexural modulus of a comparative composition that is identical except that it does not comprise the high aspect ratio particulate mineral.

The flame-retardant polymer composition may, for example, have a flexural modulus that is within (i.e. + or −) about 20% of the flexural modulus of a comparative composition that is identical except that it comprises an additional amount of the reinforcing material in place of the high aspect ratio particulate mineral. The comparative composition is identical in every sense except that the high aspect ratio particulate mineral is replaced by the same amount of reinforcing material so that the total loading of the reinforcing material and high aspect ratio particulate mineral remains unchanged. In certain embodiments, the flexural modulus is within about 18% or within about 16% or within about 15% or within about 14% or within about 12% or within about 10% or within about 8% or within about 6% or within about 5% of the flexural modulus of a comparative composition that is identical except that it comprises an additional amount of the reinforcing material in place of the high aspect ratio particulate mineral.

The flame-retardant polymer composition may, for example, comprise equal to or less than about 50% reinforcing material based on the total weight of the flame-retardant polymer composition. For example, the flame-retardant polymer composition may comprise equal to or less than about 45% or equal to or less than about 40% or equal to or less than about 35% or equal to or less than about 30% or equal to or less than about 25% reinforcing material based on the total weight of the flame-retardant polymer composition.

The flame-retardant polymer composition may, for example, have a tensile modulus ranging from about 2000 MPa to about 18,000 MPa. For example, the flame-retardant polymer composition may have a tensile modulus ranging from about 2000 MPa to about 17,000 MPa or from about 2000 MPa to about 16,000 MPa or from about 2000 MPa to about 15,000 MPa or from about 2000 MPa to about 14,000 MPa or from about 2000 MPa to about 13,000 MPa or from about 2000 MPa to about 12,000 MPa. For example, the flame-retardant polymer composition may have a tensile modulus ranging from about 2500 MPa to about 11,500 MPa or from about 3000 MPa to about 11,000 MPa or from about 3500 MPa to about 10.500 MPa or from about 4000 MPa to about 10,000 MPa or from about 4500 MPa to about 9500 MPa or from about 5000 MPa to about 9000 MPa or from about 5500 MPa to about 8500 MPa or from about 6000 MPa to about 8000 MPa or from about 6500 MPa to about 7500 MPa. For example, the flame-retardant polymer composition may have a tensile modulus ranging from about 8000 MPa to about 13,000 MPa or from about 8000 MPa to about 12,000 MPa. For example, the flame-retardant polymer composition may have a tensile modulus ranging from about 8000 Mpa to about 9000 MPa. For example, the flame-retardant polymer composition may have a tensile strength ranging from about 11,000 MPa to about 13,000 MPa. Tensile modulus may, for example be measured by ISO 527 (Type 1A) (at 5 mill/min speed).

The flame-retardant polymer composition may, for example, have a flexural strength ranging from about 80 MPa to about 350 MPa. For example, the flame-retardant polymer composition may have a flexural strength ranging from about 90 MPa to about 340 MPa or from about 100 MPa to about 330 MPa or from about 110 MPa to about 320 MPa or from about 120 MPa to about 310 MPa or from about 130 MPa to about 300 MPa or from about 140 MPa to about 290 MPa or from about 150 MPa to about 280 MPa. For example, the flame-retardant polymer composition may have a flexural strength ranging from about 100 MPa to about 200 MPa or from about 120 MPa to about 180 MPa or from about 140 MPa to about 160 MPa. For example, the flame-retardant polymer composition may have a flexural strength ranging from about 200 MPa to about 300 MPa or from about 220 MPa to about 280 MPa or from about 240 MPa to about 280 MPa. Flexural strength may, for example, be measured by ISO 178 (at 64 mm span and 2 mm/min speed).

The flame-retardant polymer composition may, for example, have a tensile strength ranging from about 80 MPa to about 200 MPa. For example, the flame-retardant polymer composition may have a tensile strength ranging from about 90 MPa to about 190 MPa or from about 100 MPa to about 180 MPa or from about 110 MPa to about 170 MPa or from about 120 MPa to about 160 MPa or from about 130 MPa to about 150 MPa. For example, the flame-retardant polymer composition may have a tensile strength ranging from about 80 MPa to about 100 MPa. For example the flame-retardant polymer composition may have a tensile strength ranging from about 150 MPa to about 190 MPa. Tensile strength may, for example be measured by ISO 527 (Type 1A) (at 5 mm/min speed).

The flame-retardant polymer composition may, for example, have a tensile elongation ranging from about 1% to about 15%. For example, the flame-retardant polymer composition may have a tensile elongation ranging from about 2% to about 14% or from about 3% to about 13% or from about 4% to about 12% or from about 5% to about 11% or from about 6% to about 10% or from about 7% to about 9%. For example, the flame-retardant polymer composition may have a tensile elongation ranging from about 1% to about 5% or from about 1% to about 4%. Tensile elongation may, for example, be measured by ISO 527 (Type 1A) (at 5 mm/min speed).

The flame-retardant polymer composition may, for example, have an ISO notched Izod impact ranging from about 3 kJ/m$^2$ to about 20 kJ/m$^2$. For example, the flame-retardant polymer composition may have an ISO notched Izod impact ranging from about 4 kJ/m$^2$ to about 19 kJ/m$^2$ or from about 5 kJ/m$^2$ to about 18 kJ/m$^2$ or from about 6 kJ/m$^2$ to about 17 kJ/m$^2$ or from about 7 kJ/m$^2$ to about 16 kJ/m$^2$ or from about 8 kJ/m$^2$ to about 15 kJ/m$^2$ or from about 9 kJ/m$^2$ to about 14 kJ/m$^2$ or from about 10 kJ/m$^2$ to about 13 kJ/m$^2$. For example, the flame-retardant polymer composition may have an ISO notched Izod impact ranging from about 3 kJ/m$^2$ to about 7 kJ/m$^2$. For example, the flame-retardant polymer composition may have an ISO notched Izod impact ranging from about 11 kJ/m$^2$ to about 15 kJ/m$^2$. For example, the flame-retardant polymer composition may have an ISO notched Izod impact ranging from about 3 kJ/m$^2$ to about 15 kJ/m$^2$. ISO notched Izod impact is measured by ISO 180 at 23° C.

The flame-retardant polymer composition may, for example, have an ASTM notched Izod impact ranging from about 30 J/m$^2$ to about 200 J/m$^2$. For example, the flame-retardant polymer composition may have an ASTM notched Izod impact ranging from about 40 J/m$^2$ to about 190 J/m$^2$ or from about 50 J/m$^2$ to about 180 J/m$^2$ or from about 60 J/m$^2$ to about 170 J/m$^2$ or from about 70 J/m$^2$ to about 160 J/m$^2$ or from about 80 J/m$^2$ to about 150 J/m$^2$ or from about 90 J/m$^2$ to about 140 J/m$^2$ or from about 100 J/m$^2$ to about 130 J/m$^2$ or from about 110 J/m$^2$ to about 120 J/m$^2$. For example, the flame-retardant polymer composition may have an ASTM notched Izod impact ranging from about 40 J/m$^2$ to about 60 J/m$^2$. For example, the flame-retardant polymer composition may have an ASTM notched Izod impact ranging from about 120 J/m$^2$ to about 140 J/m$^2$. For example, the flame-retardant polymer composition may have an ASTM notched Izod impact ranging from about 40 J/m$^2$ to about 140 J/m$^2$. ASTM notched Izod impact is measured by ASTM D256 at 23° C.

The flame-retardant polymer composition may, for example, have a heat deflection temperature (HDT) ranging from about 160° C. to about 260° C. For example, the flame-retardant polymer composition may have a HDT ranging from about 165° C. to about 255° C. or from about 170° C. to about 250° C. or from about 175° C. to about 245° C. or from about 180° C. to about 240° C. or from about 185° C. to about 235° C. or from about 190° C. to about 230° C. or from about 195° C. to about 225° C. or from about 200° C. to about 220° C. For example, the flame-retardant polymer composition may have a HDT ranging from about 200° C. to about 240° C. HDT may, for example, be measured in an edgewise orientation and 100 mm span using ISO-75 at 0.45 MPa load.

The flame-retardant polymer composition may, for example, have a HDT that is within (i.e. + or −) about 20% of the HDT of a comparative composition that is identical except that it does not comprise the high aspect ratio particulate mineral. For example, the flame-retardant polymer composition may have a HOT that is within about 18% or within about 16% or within about 15% or within about 14% or within about 12% or within about 10% or within about 8% or within about 6% or within about 5% of the HOT of a comparative composition that is identical except that it does not comprise the high aspect ratio particulate mineral.

The flame-retardant polymer composition may, for example, have a HDT that is within (i.e. + or −) about 20% of the HDT of a comparative composition that is identical except that it comprises an additional amount of the reinforcing material in place of the high aspect ratio particulate mineral. The comparative composition is identical in every sense except that the high aspect ratio particulate mineral is replaced by the same amount of reinforcing material so that the total loading of the reinforcing material and high aspect ratio particulate mineral remains unchanged. For example, the flame-retardant polymer composition may have a HDT that is within about 18% or within about 16% or within about 15% or within about 14% or within about 12% or within about 10% or within about 8% or within about 6% or within about 5% of the HDT of a comparative composition that is identical except that it comprises an additional amount of the reinforcing material in place of the high aspect ratio particulate mineral.

The flame-retardant polymer composition may, for example, have a spiral flow length ranging from about 100 mm to about 1000 mm. For example, the flame-retardant polymer composition may have a spiral flow length ranging from about 150 mm to about 950 mm or from about 200 mm to about 900 mm or from about 250 mm to about 850 mm or from about 300 mm to about 800 mm or from about 450 mm to about 750 mm or from about 500 mm to about 700 mm or from about 550 mm to about 650 mm. For example, the flame retardant polymer composition may have a spiral flow length ranging from about 200 mm to about 400 mm or from about 250 mm to about 400 mm. Spiral flow length may, for example, be measured by keeping injection molding parameters constant when molding using a spiral mold on a 66T Arburg Allrounder 370 E injection molding unit and comparing formulations. The temperature profile may be as follows (zone 1: 470 F, zone 2: 500 F, zone 3: 530 F, zone 4: 540 F, die: 550 F, mold (platen): 180 F). The injection shot size may be 0.9 inches (about 23 mm). The injection velocity may be 1.0 inches/second (about 25 mm per second). The injection hold pressure may be 1500 psi. The injection back pressure may be 2300 psi. The screw rpm may be 100. The cooling time may be 15 seconds.

The flame-retardant polymer composition may, for example, have a spiral flow length that is equal to or greater than the spiral flow length of a comparative composition that is identical except that it does not comprise the high aspect ratio particulate mineral. The flame-retardant polymer composition may, for example, have a spiral flow length that is at least about 2% or at least about 4% or at least about 5% or at least about 6% or at least about 8% or at least about 10% greater than the spiral flow length of a comparative composition that is identical except that it does not comprise the high aspect ratio particulate mineral. The flame-retardant polymer composition may, for example, have a spiral flow length that is up to about 20% or up to about 18% or up to about 16% or up to about 15% or up to about 14% or up to about 12% greater than the spiral flow length of a comparative composition that is identical except that it does not comprise the high aspect ratio particulate mineral.

The flame-retardant polymer composition may, for example, have a spiral flow length that is equal to or greater than the spiral flow length of a comparative composition that is identical except that it comprises an additional amount of the reinforcing material in place of the high aspect ratio particulate mineral. The comparative composition is identical in every sense except that the high aspect ratio particulate mineral is replaced by the same amount of reinforcing material so that the total loading of the reinforcing material and high aspect ratio particulate mineral remains unchanged. The flame-retardant polymer composition may, for example, have a spiral flow length that is at least about 2% or at least about 4% or at least about 5% or at least about 6% or at least about 8% or at least about 10% greater than the spiral flow length of a comparative composition that is identical except that it comprises an additional amount of the reinforcing material in place of the high aspect ratio particulate mineral. The flame-retardant polymer composition may, for example, have a spiral flow length that is up to about 20% or up to about 18% or up to about 16% or up to about 15% or up to about 14% or up to about 12% greater than the spiral flow length of a comparative composition that is identical except that it comprises an additional amount of the reinforcing material in place of the high aspect ratio particulate mineral.

There is further provided herein articles made from or comprising a flame-retardant polymer composition according to any aspect or embodiment disclosed herein. The article may, for example, be a part for a car such as a car body part, a bumper, a door panel, a pipe, a dashboard, a wheel cover, an equipment housing, a display panel or an engine cover. The article may, for example, be a cable (e.g. an electrical cable) covered with a flame-retardant polymer composition as disclosed herein. The article may, for example, be an electrical connector. The article may, for example, be a housing, for example for an automotive and/or electronic application.

There is further provided herein methods of making a flame-retardant polymer composition according to any aspect or embodiment disclosed herein. The methods may, for example, comprise mixing the polymer, the flame retardant, the high aspect ratio particulate mineral and any optional additives.

The flame-retardant polymer compositions described herein may, for example, be made by compounding the polymer with the flame retardant, high aspect ratio particulate mineral, and any optional additives such as reinforcing material. Compounding per se is a technique which is well known to persons skilled in the art of polymer processing and manufacture and consists of preparing plastic formulations by mixing and/or blending polymers and optional additives in a molten state. It is understood in the art that compounding is distinct from blending or mixing processes conducted at temperatures below that at which the constituents become molten. Compounding may, for example, be used to form a masterbatch composition. Compounding may, for example, involve adding a masterbatch composition to a polymer to form a further polymer composition.

The flame-retardant polymer compositions described herein may, for example, be extruded. For example, compounding may be carried out using a screw, e.g. a twin screw, compounder, for example, a Baker Perkins 25 mm twin screw compounder. For example, compounding may be carried out using a multi roll mill, for example a two-roll mill. For example, compounding may be carried out using a co-kneader or internal mixer. The methods disclosed herein may, for example, include compression moulding or injection moulding. The polymer and/or flame retardant and/or high aspect ratio particulate mineral and/or optional additives (e.g. reinforcing material) may be premixed and fed from a single hopper.

The resulting melt may, for example, be cooled, for example in a water bath, and then pelletized. The resulting melt may be calendared to form a sheet or film.

The flame-retardant polymer compositions described herein may, for example, be shaped into a desired form or article. Shaping of the flame-retardant polymer compositions may, for example, involve heating the composition to soften it. The polymer compositions described herein may, for example, be shaped by molding (e.g. compression molding, injection molding, stretch blow molding, injection blow molding, overmolding), extrusion, casting, or thermoforming.

The foregoing broadly describes certain embodiments of the present invention without limitation. Variations and modifications as will be readily apparent to those skilled in the art are intended to be within the scope of the present invention as defined in and by the appended claims.

Examples

Formulations shown in Table 1, were compounded at 30% total loading in Ultramid® B27E polyamide 6 resin from BASF after the resin was dried to less than 0.4 wt % moisture content. The compounding was conducted using a ZE 25A×46D UTXi Berstorff twin-screw extruder at 250 rpm and 15 kg/hr total throughput. Chopped glass fiber (GF) (EC10-675, 4 mm from Johns Manville) was side-fed into Barrel Zone 5, while wollastonite (having an aspect ratio of 9, a $d_{50}$ (laser) of 7 μm and a BET surface area of 2.9 m$^2$/g), talc (having an aspect ratio of 100, $d_{50}$ (laser) of 10 μm, a $d_{95}$ (laser) of 25 μm and a BET surface area of 15 m$^2$/g), or mica (having an aspect ratio of 80, a $d_{50}$ of 25 μm, a $d_{95}$ of 80 μm and a BET surface area of 3.5 m$^2$/g) were side-fed at Barrel Zone 3, and the flame retardant (FR) additive (Exolit OP 1314 (aluminium diethyl phosphinate) from Clariant) was fed into the extruder throat along with PA6 resin. ISO and FR test specimens were then prepared using ISO and UL94 FR molds and the 66-ton Arburg Allrounder 370E 600-170 injection molder after drying the compounded pellets to less than 0.2 wt % moisture content. The dry compounds were also injection molded using a spiral flow mold to compare the flow performance (spiral length) for injection molding applications.

TABLE 1

| Polyamide 6 | Exolit OP 1314 | Glass Fiber | Talc/Mica/Wollastonite |
|---|---|---|---|
| 60 | 10 | 30 | 0 |
| 60 | 10 | 20 | 10 |
| 57.5 | 12.5 | 30 | 0 |
| 57.5 | 12.5 | 20 | 10 |
| 55 | 15 | 30 | 0 |
| 55 | 15 | 20 | 10 |
| 52.5 | 17.5 | 30 | 0 |
| 52.5 | 17.5 | 20 | 10 |
| 50 | 20 | 30 | 0 |
| 50 | 20 | 20 | 10 |

Injection molded ISO specimens were sealed in moisture-tight sacks, conditioned for 48 hours at room temperature, and tested ("dry as molded") for the following properties:

Flexural properties (flexural modulus and strength) using ISO 178 Standard (at 64 mm span and 2 mm/min speed)

Tensile properties (tensile modulus and strength) using ISO 527 (Type 1A) Standard (at 5 mm/min speed)

Notched Izod Impact using ISO 180 Standard at 23° C.

Heat Distortion Temperature (HDT) in edgewise orientation and 100 mm span using ISO-75 at 0.45 MPa load Elongation at break Spiral flow length UL94 injection molded FR specimens (bars) at three thicknesses (⅛", 1/16", 1/32") were also sealed in moisture tight sack and tested by the UL94 standard.

Figure 2:
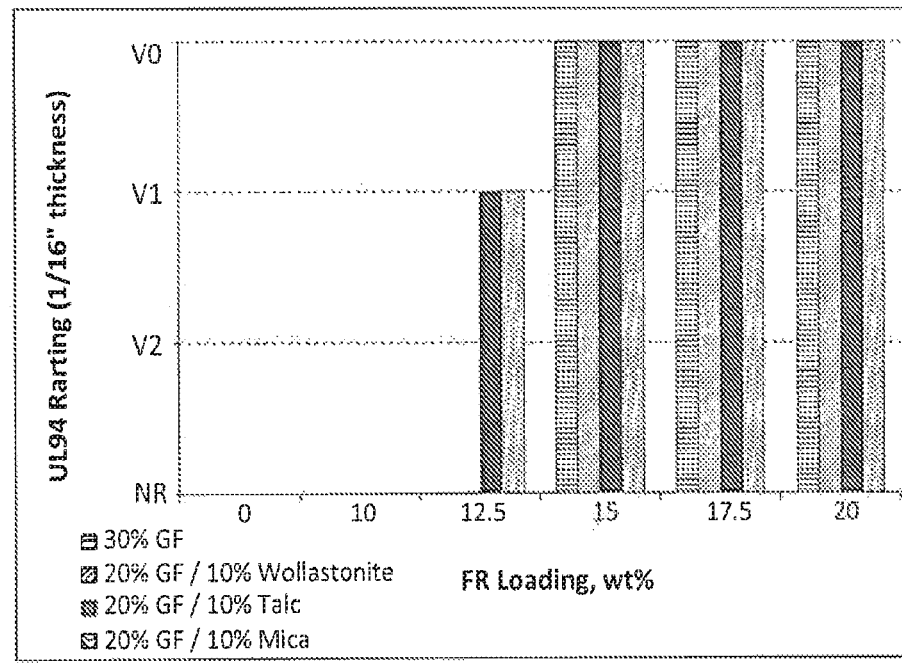
FIG. 2 shows the UL94 flame-retardancy rating of the compositions specified in Table 1 at a thickness of ¹⁄₁₆"
Figure 3:
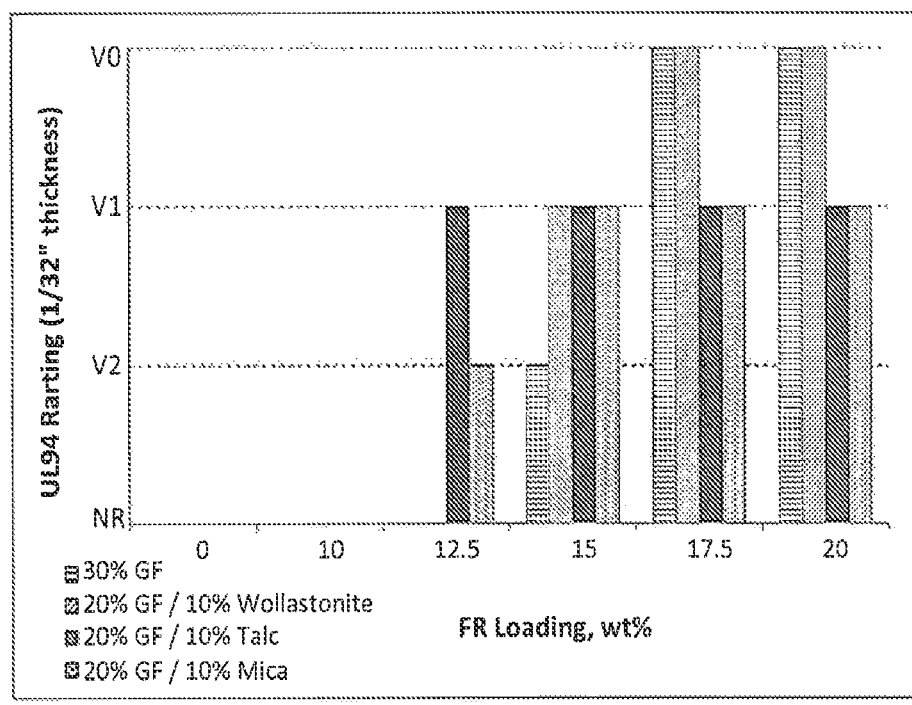
FIG. 3 shows the UL94 flame-retardancy rating of the compositions specified in Table 1 at a thickness of ¹⁄₃₂"
Figure 4:
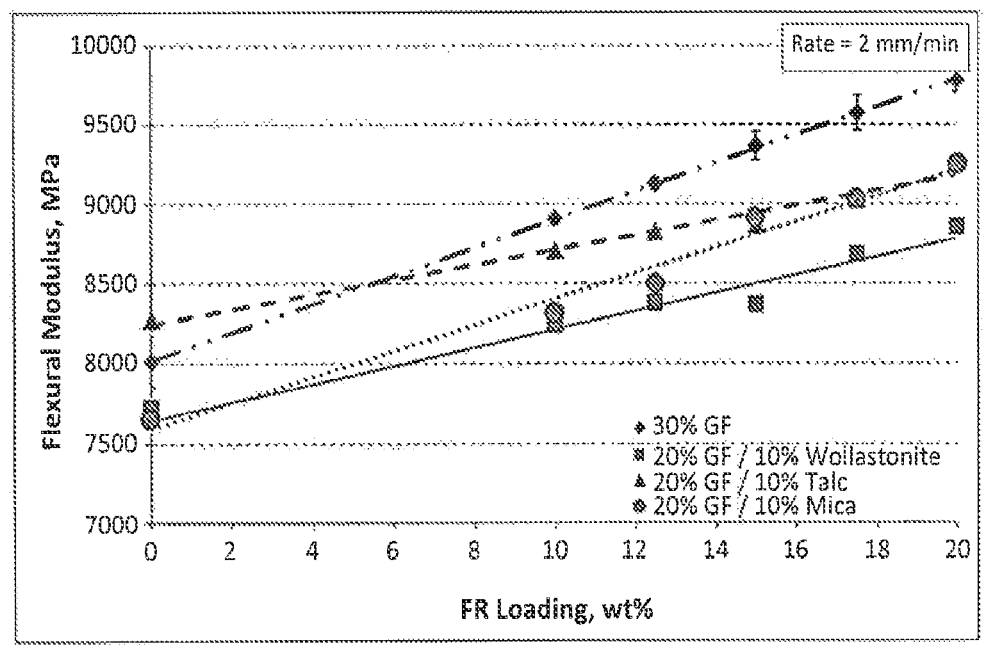
FIG. 4 shows the flexural modulus of the compositions specified in Table 1.
Figure 5:
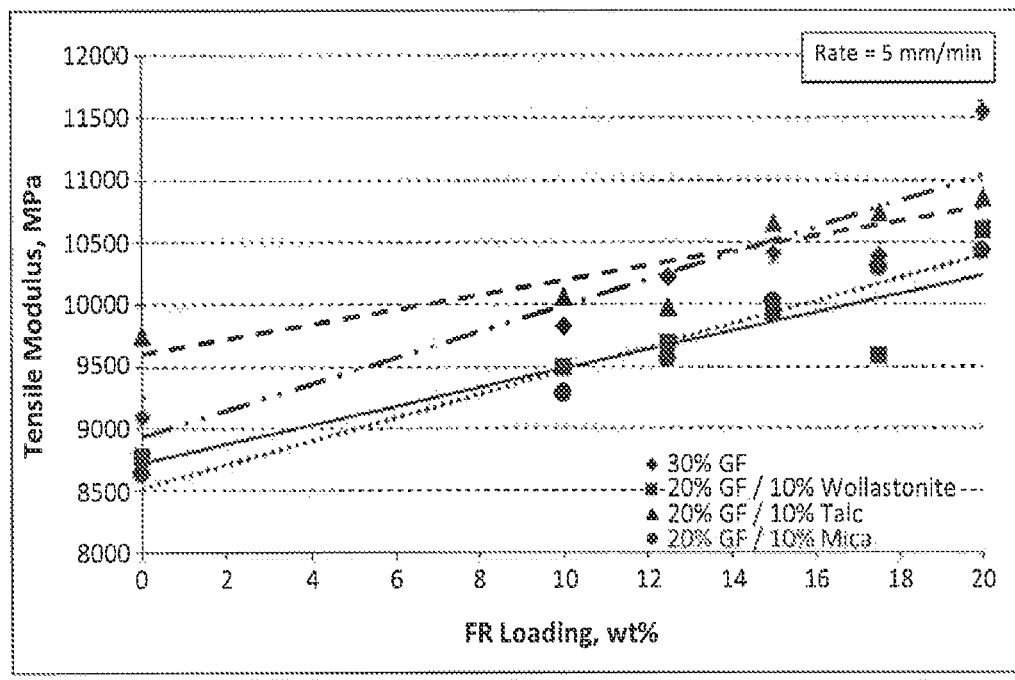
FIG. 5 shows the tensile modulus of the compositions specified in Table 1.
Figure 6:
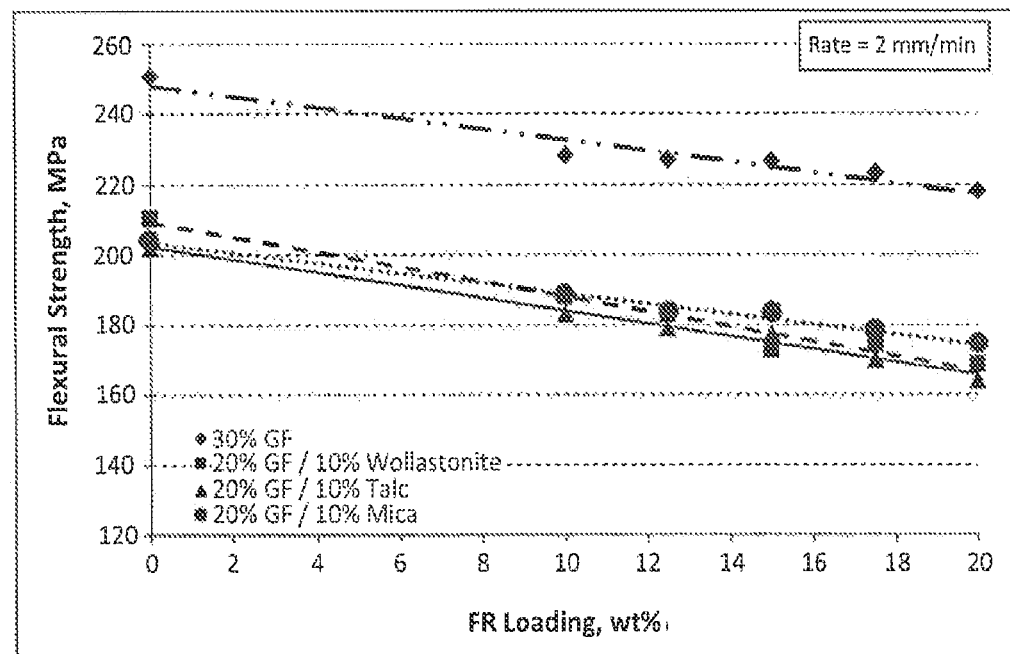
FIG. 6 shows the flexural strength of the compositions specified in Table 1.
Figure 7:
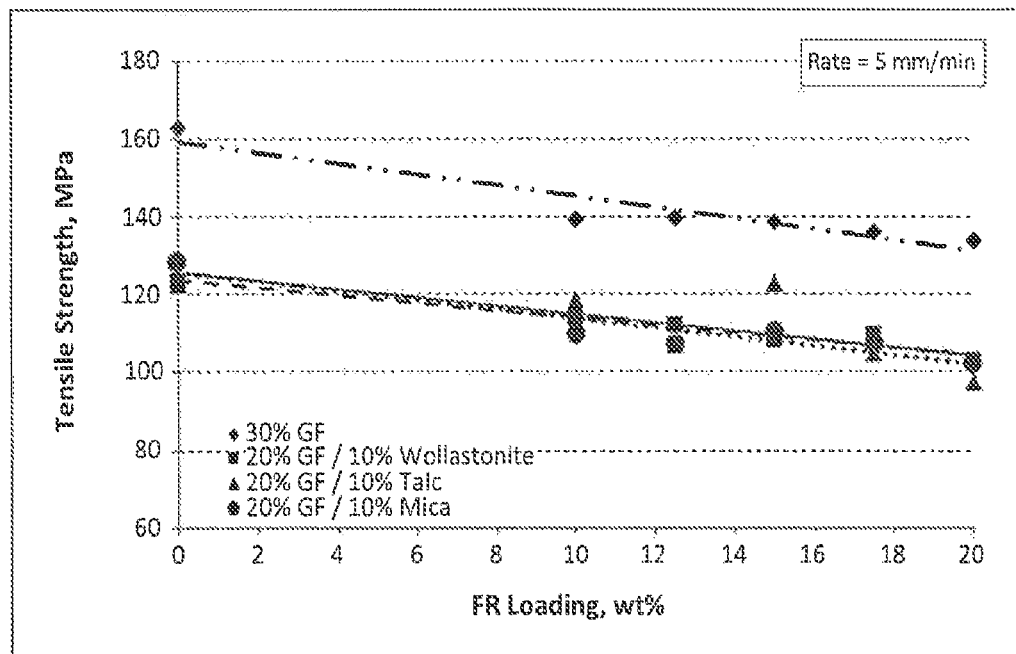
FIG. 7 shows the tensile strength of the compositions specified in Table 1.
Figure 8:
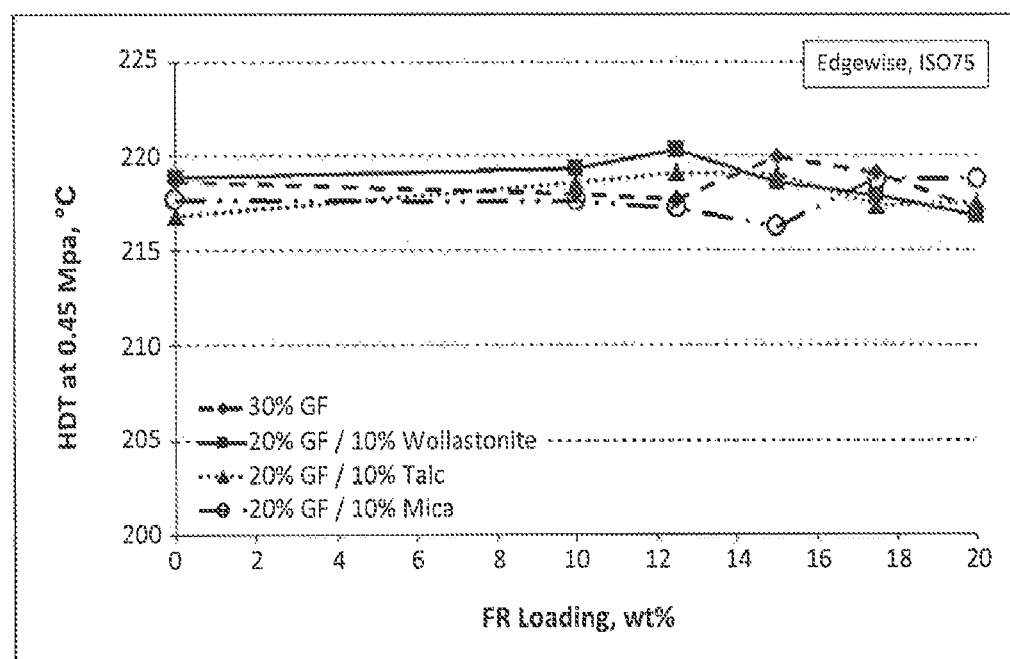
FIG. 8 shows the heat deflection temperature of the compositions specified in Table 1.
Figure 9:
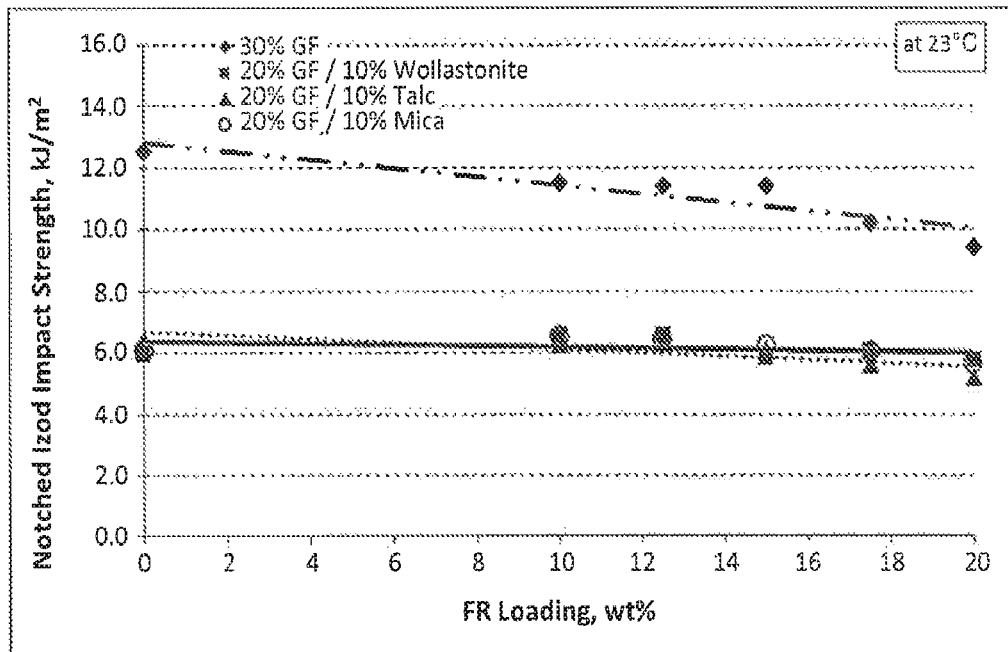
FIG. 9 shows the ISO notched Izod impact strength of the compositions specified in Table 1.
Figure 10:
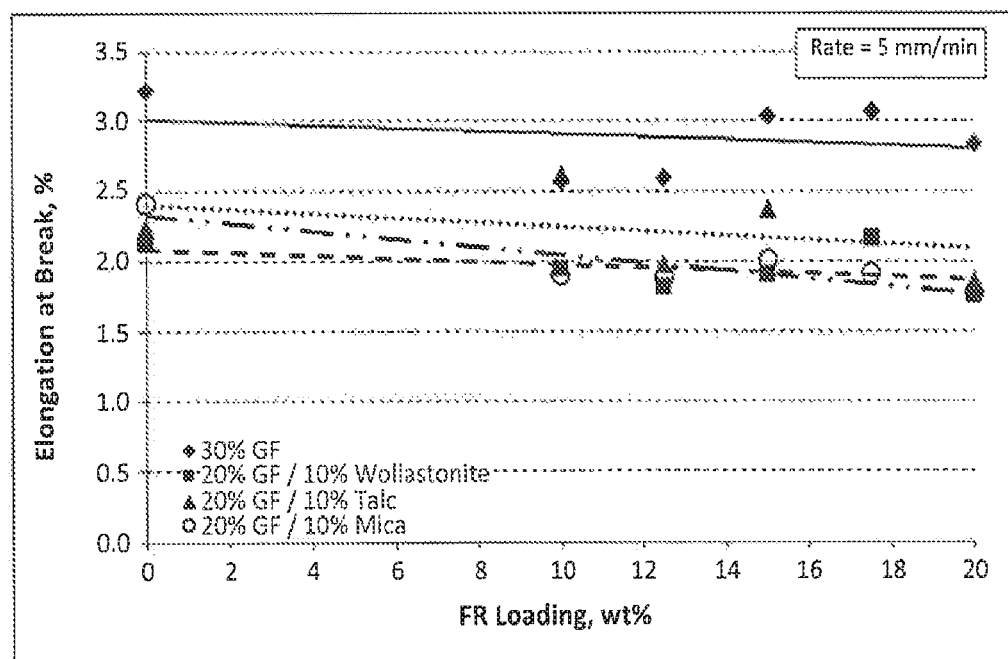
FIG. 10 shows the elongation at break of the compositions specified in Table 1.
Figure 11:
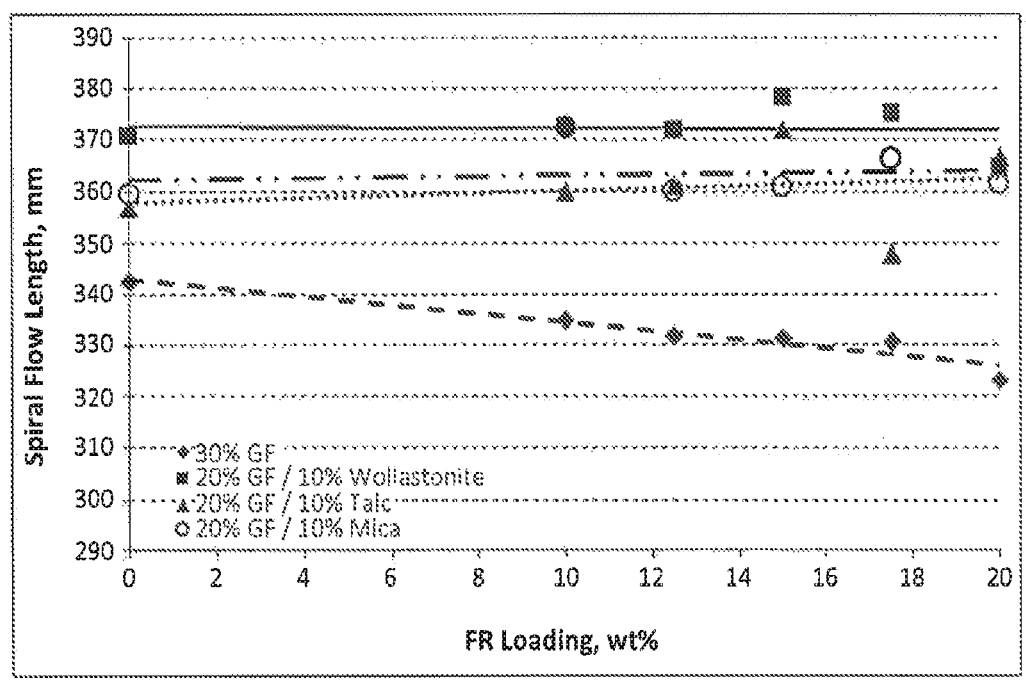
FIG. 11 shows the spiral flow length of the compositions specified in Table 1.

The UL94 flame-retardancy test results are shown in FIGS. 1 to 3.

At ⅛" thickness, replacing 10% glass fiber with talc allows achieving V0 rating at 10% FR loading, while using 10%© mica results in V0 rating at 12.5% FR and V1 rating at 10% FR loading. The formulations with 10% wollastonite replacement or the baseline with 30% GF did not achieve any UL94 rating at 10% or 12.5% FR loading.

At 1/16" thickness, replacing 10% glass fiber with either talc or mica allows achieving V0 rating at 12.5% loading. The formulations with 10% wollastonite replacement or the baseline with 30% GF did not achieve any UL94 rating at 12.5% FR loading.

At 1/32" thickness, replacing 10% glass fiber with either talc only allowed V1 rating (failed to achieve V0 rating) at FR loading levels up to 20%. Mica allowed only V2 rating at 10% and V1 rating at higher FR loadings (the V0 rating at 17.5% FR is likely an outlier considering that V1 rating was achieved at 20% FR loading). However, replacing 10% of glass fiber with wollastonite allowed achieving V0 rating at 17.5% or higher FR loading, and V1 rating at 15% FR loading that over performs the baseline formulation with 30% GF that achieved V2 rating at this loading level.

The results of the flexural and tensile tests, heat deflection temperature tests, ISO notched Izod impact tests and spiral flow length tests are shown in FIGS. 4 to 11.

The mechanical properties show that the addition of FR loading increases in stiffness (flexural and tensile modulus) but decreases tensile/flexural strength, notched Izod impact strength, spiral flow length and tensile elongation (slightly). The addition of FR loading did not affect HDT at the formulations tested.

The replacement of 10% of glass fibre with minerals slightly decreased stiffness compared to glass filled FR formulation but stiffness remained similar or better than glass filled non-FR formulation. The difference in stiffness was mild to negligible in the case of talc. The replacement of 10% of glass fibre with minerals also decreased notched Izod impact and tensile elongation at break, but both values were already quite low for the formulation due to the heavy loading of FR and GF/minerals.

The replacement of 10% glass fibre with minerals did not affect HDT, and had a positive effect on increasing melt flow as shown in the spiral flow length data. The best spiral flow performance was observed for wollastonite followed by mica,

The invention claimed is:

1. A flame-retardant polymer composition comprising:
   a polymer in an amount of around 50 wt % and up to 60 wt % of the total weight of the flame-retardant polymer composition;
   a reinforcing material in an amount of around 20 wt % of the total weight of the flame- retardant polymer composition;
   a flame retardant in an amount of around 10 wt % and up to 15 wt % of the total weight of the flame-retardant polymer composition; and
   a high aspect ratio particulate mineral in an amount of around 10 wt % the total weight of the flame-retardant polymer composition, wherein the high aspect ratio particulate mineral comprises talc, wherein the high aspect particulate mineral has an aspect ratio of around 100, and wherein the flame-retardant polymer composition has a flame-retardancy rating equal to or greater than V-2 when measured according to UL94.

2. The flame-retardant polymer composition of claim 1, wherein the polymer is a polyamide.

3. The flame-retardant polymer composition of claim 1, wherein the flame retardant is a particulate mineral flame retardant, an organohalogen and/or a phosphorous-containing compound.

4. The flame-retardant polymer composition of claim 1, wherein the flame retardant is an intumescent flame retardant.

5. The flame-retardant polymer composition of claim 1, wherein the flame retardant is red phosphorus, a phosphate, a polyphosphate, an organophosphate, a phosphonate, a phosphinate, a halogenated organophosphate, a phosphazene, a polyphosphazene, a triazine or a combination of one or more thereof.

6. The flame-retardant polymer composition of claim 1, wherein
the reinforcing material comprises glass fibres, carbon fibres or a combination thereof; and
the glass fibres have a fibre, length ranging from about 3 mm to about 8 mm and a fibre diameter ranging from about 6 µm to about 20 µm.

7. The flame-retardant polymer composition of claim 1, wherein the high aspect ratio particulate mineral has a d95 laser ranging from about 25 µm to about 75 µm.

8. The flame-retardant polymer composition of claim 1, wherein the high aspect ratio particulate mineral has a BET surface area ranging from about 0.5 to about 30 m2/g.

9. The flame-retardant polymer composition of claim 1, wherein the talc has a lamellarity index equal to or greater than about 2.8.

10. The flame-retardant polymer composition of claim 1, wherein the flame-retardant polymer composition has:
a flexural modulus ranging from about 2000 MPa to about 16,000 MPa; and a spiral flow length ranging from about 100 mm to about 1000 mm.

11. A car part, electric cable, or other article made from or comprising a flame-retardant polymer composition of claim 1.

12. The flame-retardant polymer composition of claim 1, wherein the high aspect ratio particulate mineral has a d50 laser around 10 µm.

13. The flame-retardant polymer composition of claim 1, wherein the flame-retardancy rating is equal to or greater than V-0 when measured according to UL94, and wherein the flame retardant is present in the flame-retardant polymer composition in an amount of around 10 wt % and up to 12.5 wt % of the total weight of the flame-retardant polymer composition.

14. The flame-retardant polymer composition of claim 1, wherein the flame- retardancy rating is equal to or greater than V-1 when measured according to UL94, and wherein the flame retardant is present in the flame-retardant polymer composition in an amount of around 12.5 wt % and up to 15 wt % of the total weight of the flame-retardant polymer composition.

* * * * *